US012688812B2

(12) United States Patent
Yamasaki

(10) Patent No.: US 12,688,812 B2
(45) Date of Patent: Jul. 21, 2026

(54) LIGHT EMITTING DEVICE WITH PLURALITY OF COLUMN CIRCUITS EACH INCLUDING SELECTION CIRCUIT FOR OUTPUTTING COLOR DATA, IMAGE FORMING DEVICE, DISPLAY DEVICE, IMAGE CAPTURING DEVICE, ELECTRONIC APPARATUS, ILLUMINATION DEVICE, MOVING BODY, AND WEARABLE DEVICE

(71) Applicant: CANON KABUSHIKI KAISHA, Tokyo (JP)

(72) Inventor: Takahiro Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/051,524

(22) Filed: Feb. 12, 2025

(65) Prior Publication Data

US 2025/0265958 A1 Aug. 21, 2025

(30) Foreign Application Priority Data

Feb. 20, 2024 (JP) ................................ 2024-023949

(51) Int. Cl.
*G09G 3/20* (2006.01)
*G09G 3/3266* (2016.01)

(52) U.S. Cl.
CPC ......... *G09G 3/2003* (2013.01); *G09G 3/3266* (2013.01); *G09G 2300/0828* (2013.01); *G09G 2310/027* (2013.01); *G09G 2310/0286* (2013.01); *G09G 2310/08* (2013.01)

(58) Field of Classification Search
CPC .................................................. G09G 3/2003
USPC ........................................................... 345/76
See application file for complete search history.

(56) References Cited

U.S. PATENT DOCUMENTS

| | | | | |
|---|---|---|---|---|
| 7,808,493 | B2 | 10/2010 | Hashimoto | |
| 7,834,841 | B2 | 11/2010 | Harada | |
| 10,535,308 | B2 | 1/2020 | Ota | |
| 11,062,641 | B2 | 7/2021 | Yamasaki | |
| 11,120,728 | B2 | 9/2021 | Nagasaki | |
| 2006/0139273 | A1 * | 6/2006 | Harada | G09G 3/3614 345/89 |
| 2006/0274028 | A1 | 12/2006 | Harada | |
| 2007/0268233 | A1 | 11/2007 | Hashimoto | |

(Continued)

FOREIGN PATENT DOCUMENTS

| | | | |
|---|---|---|---|
| JP | 2003-098998 | A | 4/2003 |
| JP | 2006-337805 | A | 12/2006 |

(Continued)

*Primary Examiner* — Long D Pham
(74) *Attorney, Agent, or Firm* — Venable LLP

(57) ABSTRACT

A light emitting device comprises a plurality of pixels arranged in a plurality of rows and a plurality of columns, a plurality of column circuits to drive the columns, a voltage generation circuit to output a set of voltage signals, and a control circuit. The plurality of pixels includes a first sub-pixel for a first color, a second sub-pixel for a second color, and a third sub-pixel for a third color. Each of the plurality of column circuits includes a first selection circuit to output one of first color data, second color data, and third color data, a digital-analog converter to convert the color data into an analog signal based on the set of voltage signals, and a second selection circuit to supply the analog signal to one of the sub-pixels.

19 Claims, 21 Drawing Sheets

(56) References Cited

U.S. PATENT DOCUMENTS

| | | | | |
|---|---|---|---|---|
| 2017/0236471 | A1 | 8/2017 | Ota | |
| 2022/0208125 | A1 * | 6/2022 | Hong | G09G 3/3291 |
| 2023/0005400 | A1 * | 1/2023 | Endo | G09G 3/006 |

FOREIGN PATENT DOCUMENTS

| | | | |
|---|---|---|---|
| JP | 2007-310234 | A | 11/2007 |
| JP | 2017-142440 | A | 8/2017 |

* cited by examiner

LIGHT EMITTING DEVICE WITH PLURALITY OF COLUMN CIRCUITS EACH INCLUDING SELECTION CIRCUIT FOR OUTPUTTING COLOR DATA, IMAGE FORMING DEVICE, DISPLAY DEVICE, IMAGE CAPTURING DEVICE, ELECTRONIC APPARATUS, ILLUMINATION DEVICE, MOVING BODY, AND WEARABLE DEVICE

BACKGROUND OF THE INVENTION

Field of the Invention

The present invention relates to a light emitting device, for example, a light emitting device including an organic light emitting element, and to an image forming device, a display device, an image capturing device, an electronic apparatus, an illumination device, a moving body, and a wearable device to each of which the light emitting device is applied.

Description of the Related Art

There is a device in which an input digital display signal is converted into an analog video signal by a digital-analog converter (DA converter) configured to perform conversion into an analog signal based on a reference voltage, and the analog video signal is output to a display element. Japanese Patent Laid-Open No. 2003-98998 describes a flat surface display device that supplies reference voltages to a DA converter in a time-division multiplex manner.

When each of a plurality of digital-analog (DA) converters arranged to correspond to pixel columns performs a conversion operation, the potential of a wiring supplying a voltage signal serving as a DA conversion reference can fluctuate. This potential fluctuation can cause a crosstalk between the columns, resulting in deterioration of image quality.

SUMMARY OF THE INVENTION

The present invention can provide a light emitting device having a configuration advantageous in suppressing deterioration of image quality caused by a conversion operation of a DA converter in the light emitting device.

According one aspect of the disclosure, there is provided a light emitting device that comprises a plurality of pixels arranged to form a plurality of rows and a plurality of columns, a plurality of column circuits configured to drive the plurality of columns, respectively, a voltage generation circuit configured to output a set of voltage signals, and a control circuit, Each of the plurality of pixels includes at least a first sub-pixel configured to emit light in a first color, a second sub-pixel configured to emit light in a second color different from the first color, and a third sub-pixel configured to emit light in a third color different from the first color and the second color. Each of the plurality of column circuits includes a first selection circuit configured to output one of first color data, second color data, and third color data corresponding to the first color, the second color, and the third color, which are input to each of the plurality of column circuits, a digital-analog converter configured to convert, based on the set of voltage signals output by the voltage generation circuit, the output one of the first color data, the second color data, and the third color data into an analog signal, and a second selection circuit configured to supply the analog signal output from the digital-analog converter to one of the first sub-pixel, the second sub-pixel, and the third sub-pixel that emits light in a corresponding color. The plurality of column circuits include at least a first column circuit, a second column circuit, and a third column circuit, and the control circuit controls such that, in a first period, the first selection circuit of the first column circuit outputs the first color data to the digital-analog converter, the first selection circuit of the second column circuit outputs the second color data to the digital-analog converter, and the first selection circuit of the third column circuit outputs the third color data to the digital-analog converter.

Further features of the present invention will become apparent from the following description of exemplary embodiments (with reference to the attached drawings).

DESCRIPTION OF THE EMBODIMENTS

Figure 1:
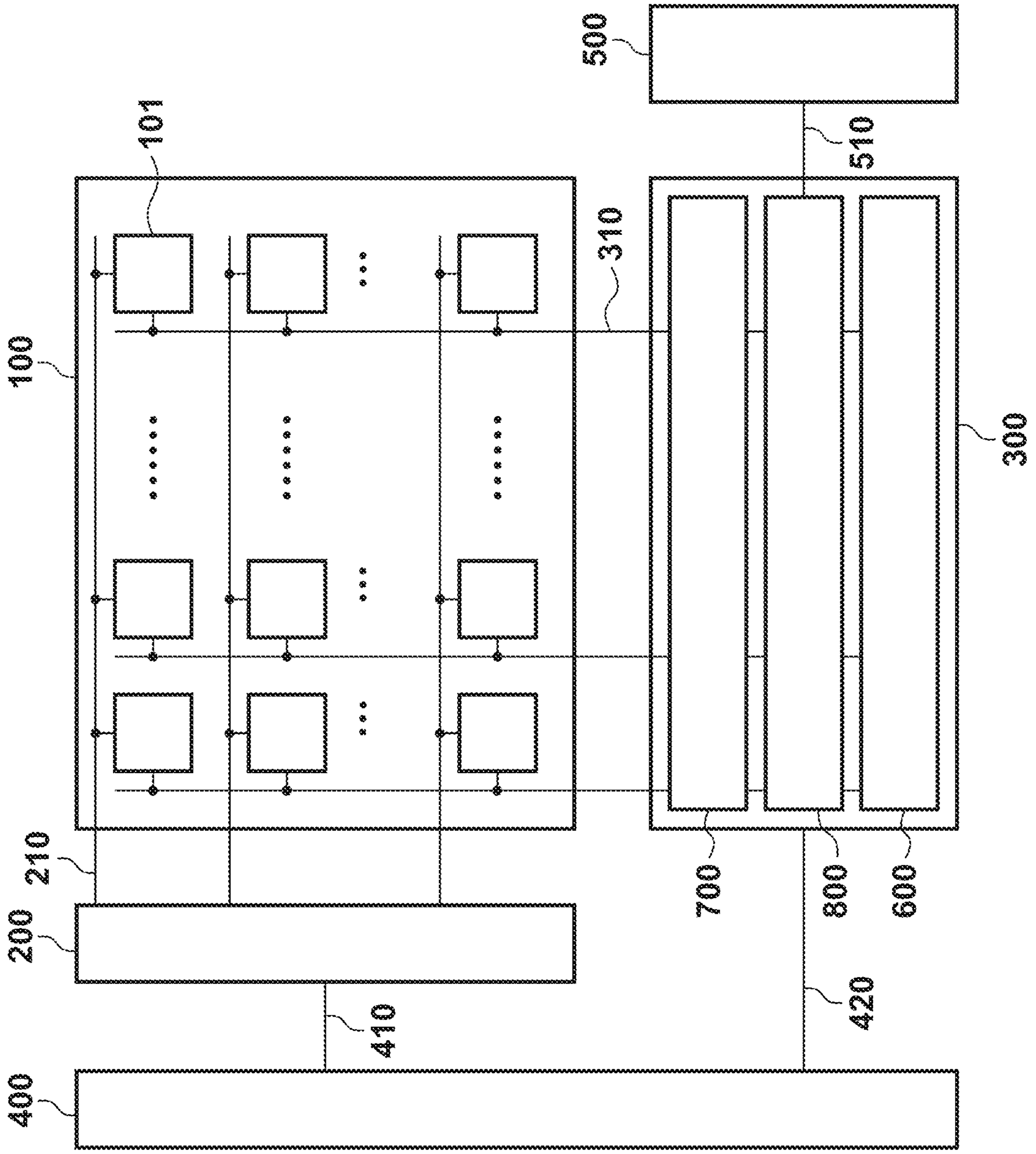
FIG. 1 is a block diagram of a light emitting device according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

A light emitting device according to the first embodiment will be described below. FIG. 1 is a schematic view showing one form of a light emitting device according to the present invention. The light emitting device will be described by taking, as an example, a display device that includes a pixel array 100 where a plurality of pixels 101 are arranged across a plurality of rows and a plurality of columns (two-dimensionally). A control signal is input to each pixel 101 from a vertical scanning circuit 200 via a scanning line 210 to select a pixel in a predetermined row. A luminance signal voltage Vsig as an image signal is input from a signal output circuit 300 via a signal line 310. The vertical scanning circuit 200 and the signal output circuit 300 are controlled by a control circuit 400.

The pixel 101 may include, for example, a light emitting element such as a light emitting diode. An organic light emitting element can also be used as the light emitting element. The luminance signal voltage to be input to the light emitting element is an analog signal. The light emitting element can emit light with the light emission amount corresponding to the voltage of the analog signal. Here, each pixel 101 may include a plurality of sub-pixels arranged for respective colors. In this case, the signal line 310 is arranged for each column based on each sub-pixel. For example, when one pixel includes three sub-pixels, three signal lines 310 can be arranged in one pixel column.

The signal output circuit 300 can include a horizontal scanning circuit 600, a column digital-analog converter (DAC) circuit 800 arranged across the plurality of columns, and a column driver circuit 700 arranged across the plurality of columns. The pixel array is scanned by the horizontal scanning circuit 600, and image data to be input to each column is input to the column DAC circuit 800. The image data is converted into an analog signal by the column DAC circuit 800, and output as the luminance signal voltage Vsig to the signal line 310 via the column driver circuit 700. The signal voltage written in the signal line 310 is supplied to the pixel 101 in the row selected by the vertical scanning circuit 200, and the pixel 101 emits light. Here, the circuit configuration of the pixel 101 is not limited. Here, an example will be described in which, by switching switches of a selection circuit 902, one DAC 801 supplies analog signals to the signal lines 310 connected to three sub-pixels.

A reference voltage generation circuit 500 can generate reference voltages corresponding to the number of tones of the image data, and supply the reference voltages to the column DAC circuit 800 via a reference voltage line 510. The reference voltage generation circuit 500 may also generate a reference voltage Vcal used for variation correction of the column driver circuit 700 and the pixels 101. In this case, the reference voltage Vcal may be supplied to the pixel 101 via the column driver circuit 700 and the signal line 310.

Figure 2:
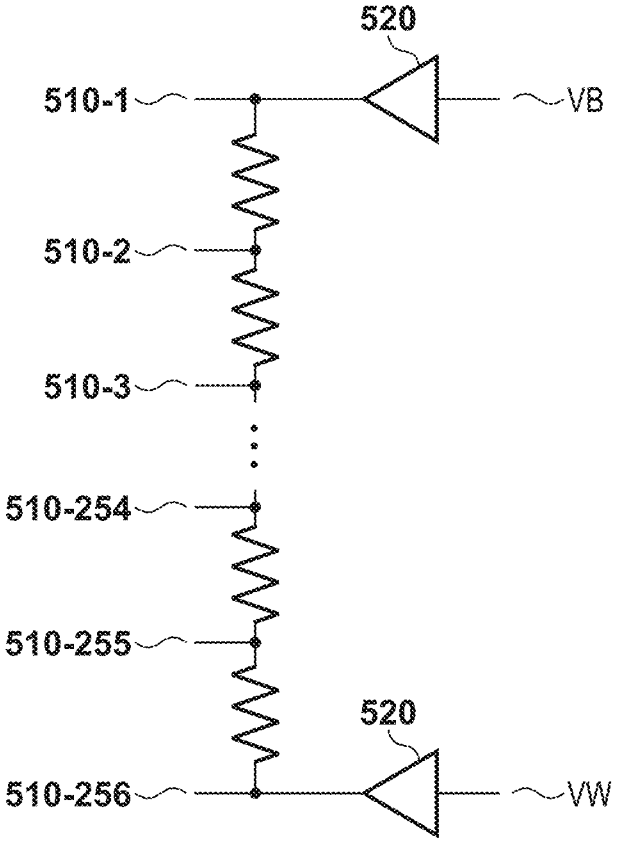
FIG. 2 is a schematic view of a reference voltage generation circuit.

The reference voltage generation circuit 500 is, for example, a circuit as shown in FIG. 2. A minimum voltage signal VB for light emission with a minimum luminance and a maximum voltage signal VW for light emission with a maximum luminance are respectively input to buffer amplifiers 520. The outputs of the buffer amplifiers 520 are divided by resistors to generate a set of voltage signals. The set of voltage signals is output to the reference voltage line 510. The example shown in FIG. 2 shows a configuration in which, when image data is 8-bit data, a set of 256 voltage signals is generated. Note that as for the voltage signals, it is sufficient that the number of voltage signals corresponding to the image data are generated and output to the reference voltage line 510. Hence, the configuration is not limited to the configuration shown in FIG. 2. Further, the position where a circuit for generating the voltage of each of the minimum voltage signal VB and the maximum voltage signal VW is not limited to a specific location. The voltage generation circuit may be mounted in a chip, or the voltage may be supplied from outside the chip.

A circuit for driving the signal line 310 connected to one pixel among the pixels arranged in a column is referred to as a column circuit for one column. The column circuit may include a set of switches used to supply input data to a digital-analog converter, the digital-analog converter, and a set of switches used to supply an output of the digital-analog converter to the signal line 310. The column circuit may also include a driving circuit corresponding to one pixel.

Figure 3:
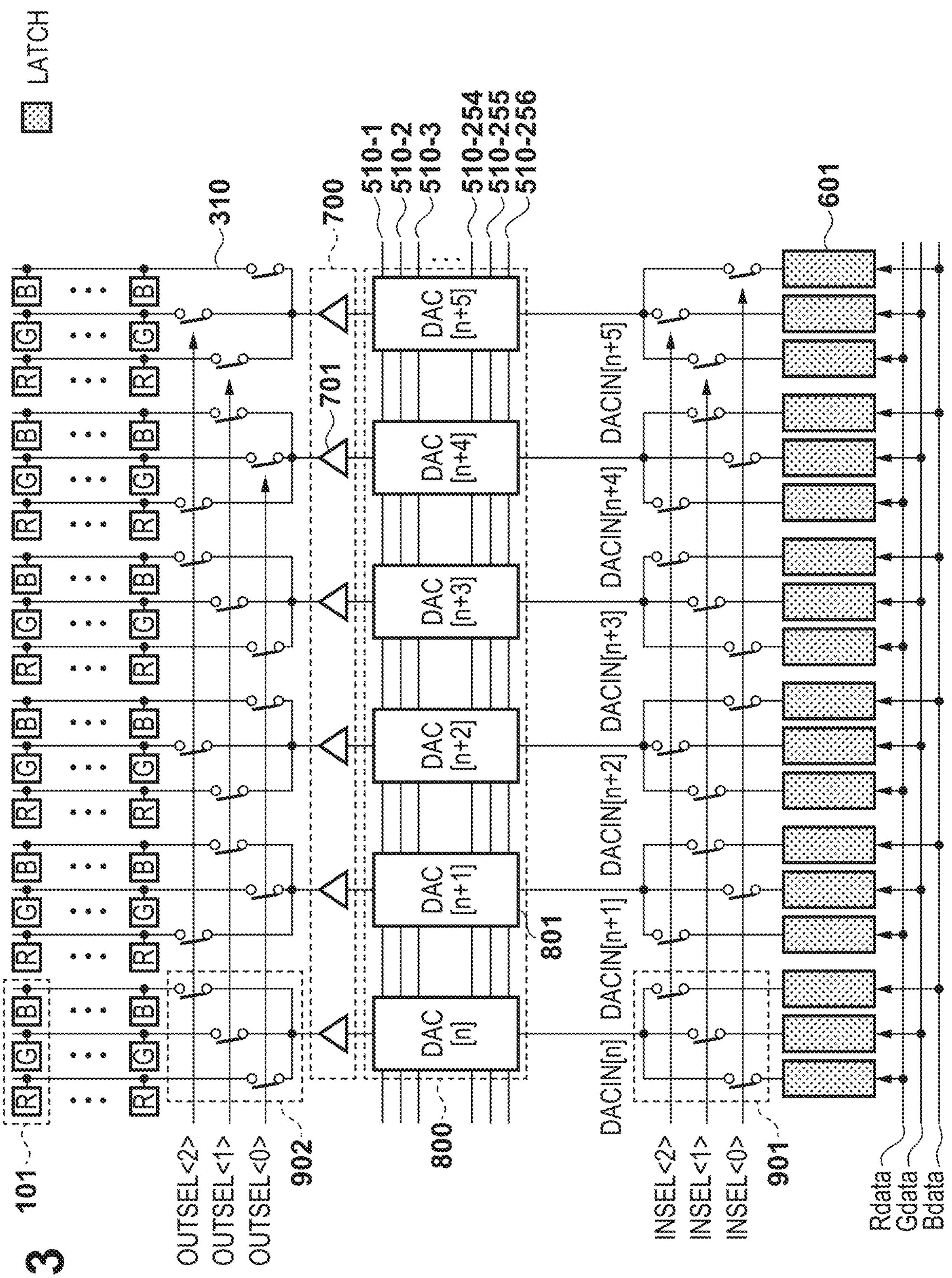
FIG. 3 is a view for explaining a column circuit according to the first embodiment.

With reference to FIG. 3 showing the nth to (n+5)th column circuits including the DAC[n] to DAC[n+5], respectively, an example of driving six pixels will be described. Note that the number of pixel columns and the number of pixels are not limited to the numbers in this example. FIG. 3 shows an example of latch circuits 601 in the horizontal scanning circuit 600, the column DAC circuit 800, the column driver circuit 700, and the pixels 101 corresponding to six pixels. This embodiment will be described using an example in which each pixel 101 is formed from three sub-pixels corresponding to three colors of red (R), green (G), and blue (B), and three sets of signal lines 310 each corresponding to the sub-pixel are arranged. The signal line 310 is commonly arranged for the pixels (sub-pixels) arranged in a column, and the pixels are driven for each row.

In the column driver circuit 700, one buffer circuit 701 corresponding to pixels can be arranged for each pixel column. In the column DAC circuit 800, one digital-analog converter (DAC) 801 can be arranged for each pixel column. A voltage output from the DAC 801 is written in the signal line 310 via the buffer circuit 701. In this case, a switch is provided between the buffer circuit 701 and the signal line 310. When the switch switches the connection between the buffer circuit 701 and the signal line 310, the signal voltage is written in the signal line 310 connected to each sub-pixel. In this example, a set of three switches functions as one selection circuit 902. In FIG. 3, in accordance with a control signal appearing on each of output control signal lines OUTSEL<0> to OUTSEL<2>, the switch located at the intersection with the output control signal line OUTSEL is controlled.

The latch circuit 601 arranged in the horizontal scanning circuit 600 can hold color data corresponding to each color, which is a digital signal input from the outside, in accordance with scanning by the horizontal scanning circuit 600. The latch circuit 601 is scanned by a control unit of the horizontal scanning circuit 600, and data for each pixel 101 stored in the latch circuit 601 is input to each DAC 801. The latch circuits 601 corresponding to the number of sub-pixels of each pixel 101 are arranged. Color data are supplied to the latch circuits 601 from data wirings Rdata, Gdata, and Bdata corresponding to each pixel 101.

Switches are provided at the input part of the DAC 801. In this example, outputs of three latch circuits are sequentially switched by the switches. In this example, a set of three switches functions as one selection circuit 901. The selection circuit 901 may include the latch circuits 601 corresponding to the switches. At this time, the above-described selection circuit 902 including the switches provided at the output of the buffer circuit 701 and the selection circuit 901 including the switches provided at the input part of the DAC 801 are synchronously switched. When the selection circuit 901 and the selection circuit 902 are synchronously switched in this manner, an operation of inputting the data corresponding to each pixel 101 to the DAC 801 and an operation of outputting the signal voltage corresponding to the data from the buffer circuit 701 can be performed synchronously. Note that in FIG. 3, in accordance with a control signal appearing on each of input control signal lines INSEL<0> to INSEL<2>, the switch located at the intersection with the input control signal line INSEL is controlled.

Figure 4:
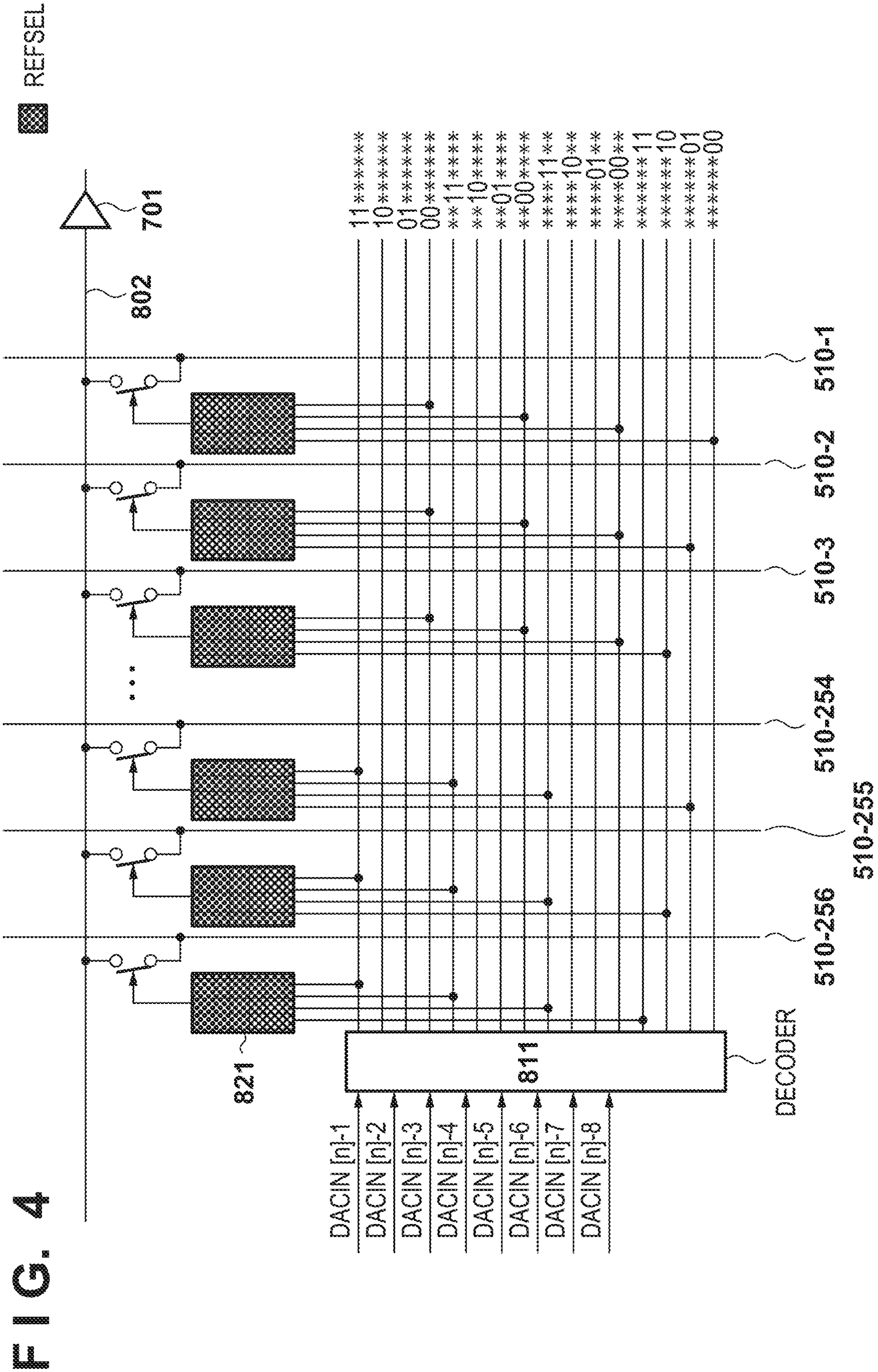
FIG. 4 is a view for explaining a digital-analog converter.

FIG. 4 shows the circuit of the nth DAC 801 as an example. Here, an example of 8-bit color data is shown. Reference voltages are input from reference voltage lines 510-1 to 510-256 to the DAC 801. A switch is connected between each reference voltage line and an output wiring 802 of the DAC 801. 8-bit image data DACIN[n]−1 to DACIN[n]−8, which are input from the latch circuit 601, are input to a decoder circuit (DECODER) 811 of the DAC 801. In this configuration, two bits (00, 01, 10, 11) are decoded as one unit, and 8-bit data is converted into 16 decode signal lines.

A reference voltage selection circuit (REFSEL) 821 is provided for each of the reference voltage lines 510-1 to 510-256. Of the 16 decode signal lines, four decode signal lines corresponding to the selected tone are combined and input to the REFSEL. In accordance with the combination of four decode signal lines each having 00, 01, 10, or 11, one of the switches connected to the reference voltage lines 510-1 to 510-256 is selected by the REFSEL 821. The selected reference voltage is input to the buffer circuit 701 via the output wiring 802. At this time, as the operation of the DAC 801, it is sufficient that the reference voltage corresponding to the data DACIN[n] is output from the DAC 801. Hence, the circuit configuration is not limited to the circuit configuration shown in FIG. 4.

Next, operation timings according to this embodiment will be described with reference to FIG. 5. When a horizontal driving (HD) signal is set at high level, writing in pixels in a predetermined row is started. The HD signal is set at high level at time t1, and a predetermined row in the pixel array 100 is selected. Signal writing in the pixels 101 arranged in the same selected row is started. At time t2, INSEL<0> is set at high level, and the switch connecting the input DACIN of the DAC 801 and each latch circuit 601 is turned on.

In this example, the left LATCH of three latch circuits LATCH arranged in the nth column is selected by the selection circuit 901 and connected to the DAC[n]. In the (n+1)th column, the second LATCH from the left of three latch circuits LATCH is selected and connected to the DAC[n+1]. In the first period from time t2 to time t3, as shown in FIG. 5, data are input in the order of R, G, B, R, G, B data to the DACIN[n+1] to DACIN[n+5] of the DACs 801 provided in the nth to (n+5)th columns. Here, red data is represented by dots, green data is represented by diagonal lines, and blue data is represented by horizontal lines.

The description of the operation will be continued. The data is input to the DAC 801 from the latch circuit 601, and the DAC 801 performs digital-analog conversion. In the DAC 801, one of the reference voltage lines 510-1 to 510-256 is selected. The output of the DAC 801 is input to the corresponding buffer circuit 701. Then, when the OUTSEL<0> is set at high level while the INSEL<0> is at high level, the switch of the selection circuit 902 connects the buffer circuit 701 to the signal line 310, and the signal voltage is written in the signal line 310. At time t3, the INSEL<0> is set at low level. The OUTSEL<0> is set at low level before the INSEL<0>, and the switch between the signal line 310 and the buffer circuit 701 and the switch between the DAC 801 and the latch circuit 601 are turned off.

In the second period from time t3 to time t4, the INSEL<1> and the OUTSEL<1> are sequentially set at high level, and the latch circuit 601 and signal line 310 different from those at time t2 are sequentially connected to the DAC 801 and the buffer circuit 701, respectively. Then, at time t4, the INSEL<1> is set at low level. The OUTSEL<1> is set at low level before the INSEL<1>, and the switches are turned off to release the connections similarly to time t3.

Then, in the third period from time t4 to time t5, the INSEL<2> and the OUTSEL<2> are sequentially set at high level, and the latch circuit 601 and signal line 310 different from those at time t2 and time t3 are sequentially connected to the DAC 801 and the buffer circuit 701, respectively. At time t5, the INSEL<2> is set at low level. The OUTSEL<2> is set at low level before the INSEL<2>, and the switches are sequentially turned off. In this manner, signal write operations for the same row are performed.

In a sequence of signal write operations, for example, the order of the timing of setting the INSEL<0> at high level and the timing of setting the OUTSEL<0> at high level at time t2 may be reversed, or they may happen at the same time. The order of timings of setting the INSEL<0> and OUTSEL<0> at low level at time t3 is also not limited. However, if the OUTSEL<0> is set at low level after the INSEL<0>, the voltage fluctuation at the time of turning off the switch between the DAC 801 and the latch circuit 601 may be written in the signal line 310. Therefore, the OUTSEL<0> is preferably set at low level before the INSEL<0>. This relationship of transition timing is also applied to the INSEL<1> and OUTSEL<1> and the INSEL<2> and OUTSEL<2>. The HD signal is set at high level at time t6, and the above-described signal write operations are repeated for the next row.

In the operations described above, the INSEL<0> to INSEL<2> are common wirings for columns. When each of the INSEL<0> to INSEL<2> is set at high level, data are input from the respective latch circuits 601 to the DACIN[n] to DACIN[n+5] simultaneously in all columns. In accordance with the input data, the DACs 801 simultaneously select one of the reference voltage lines 510-1 to 510-256, respectively. The OUTSEL<0> to OUTSEL<2> are also common wirings for columns, and controlled simultaneously in all columns. As described above, data can be input to the signal lines 310 connected to the pixels in all columns.

The data input timing to the DAC 801 will be described with reference to FIG. 5. At the timing when the INSEL<0> is set at high level and the switch is turned on at time t2, R data [n] is input to the DACIN[n]. G data [n+1] is input to the DACIN[n+1], and B data [n+2] is input to the DACIN [n+2]. Data are input to the DACIN[n+3] to DACIN[n+5] by repeating this operation, so that data of the same color are not input to all columns (nth to (n+5)th columns) at the same time. Similarly, at the timing when the INSEL<1> turns on the switch at time t3, and the timing when the INSEL<2> turns on the switch at time t4, data of the same color are not input to all columns at the same time. The plurality of columns may be divided into blocks each including a predetermined number of columns, and data of the same color may not be selected at the same time within each block.

Here, in the configuration in which data of the same color are input to all columns at the same time, the voltage fluctuation of the reference voltage line 510 can become large at the time of the selection operation of the reference voltage line 510. This is because the voltage of the reference voltage line 510 fluctuates due to the feedthrough of the switch when selecting the reference voltage and the parasitic capacitance of the control line. At this time, in adjacent pixels, data of the same color are likely to be the same data so that the same reference voltage line 510 is likely to be selected. Hence, the fluctuations are superimposed by the number of columns selected at the same time, and the voltage fluctuation becomes large. Since the voltage having fluctuated from the desired voltage is written in the signal line 310 via the buffer circuit 701, the pixel 101 may emit light with a luminance shifted from the desired luminance.

In particular, when displaying white, for which color balance is important, the above-described fluctuation causes white to appear colored, and this significantly deteriorates display quality. The deterioration of display quality can be reduced by extending the high period of the INSEL and OUTSEL until the fluctuated voltage of the reference voltage line 510 returns to the desired voltage. However, this results in the longer signal voltage write time, which may lead to a decrease in display frame rate and deterioration of the performance of the display device.

When the color data simultaneously input to the DACs 801 vary among columns as in this example, the number of columns in which the same reference voltage line 510 is selected at the same time can be reduced, thereby reducing colored display caused by the voltage fluctuation of the reference voltage line 510. In addition, the write time need not be increased, and this is advantageous for the high-speed circuit operation and improved display frame rate.

Since the display data for adjacent pixels are likely to have the same value, in this embodiment, the color data to be input to the DAC[n] to DAC[n+5] of the DACs 801 is changed between adjacent DACs, but the present invention is not limited to this. Since the reference voltage line 510 is common to the columns, the voltage fluctuation propagates not only to adjacent columns. Therefore, the color data may be changed on a block basis, each block including multiple DACs 801.

Figure 5:
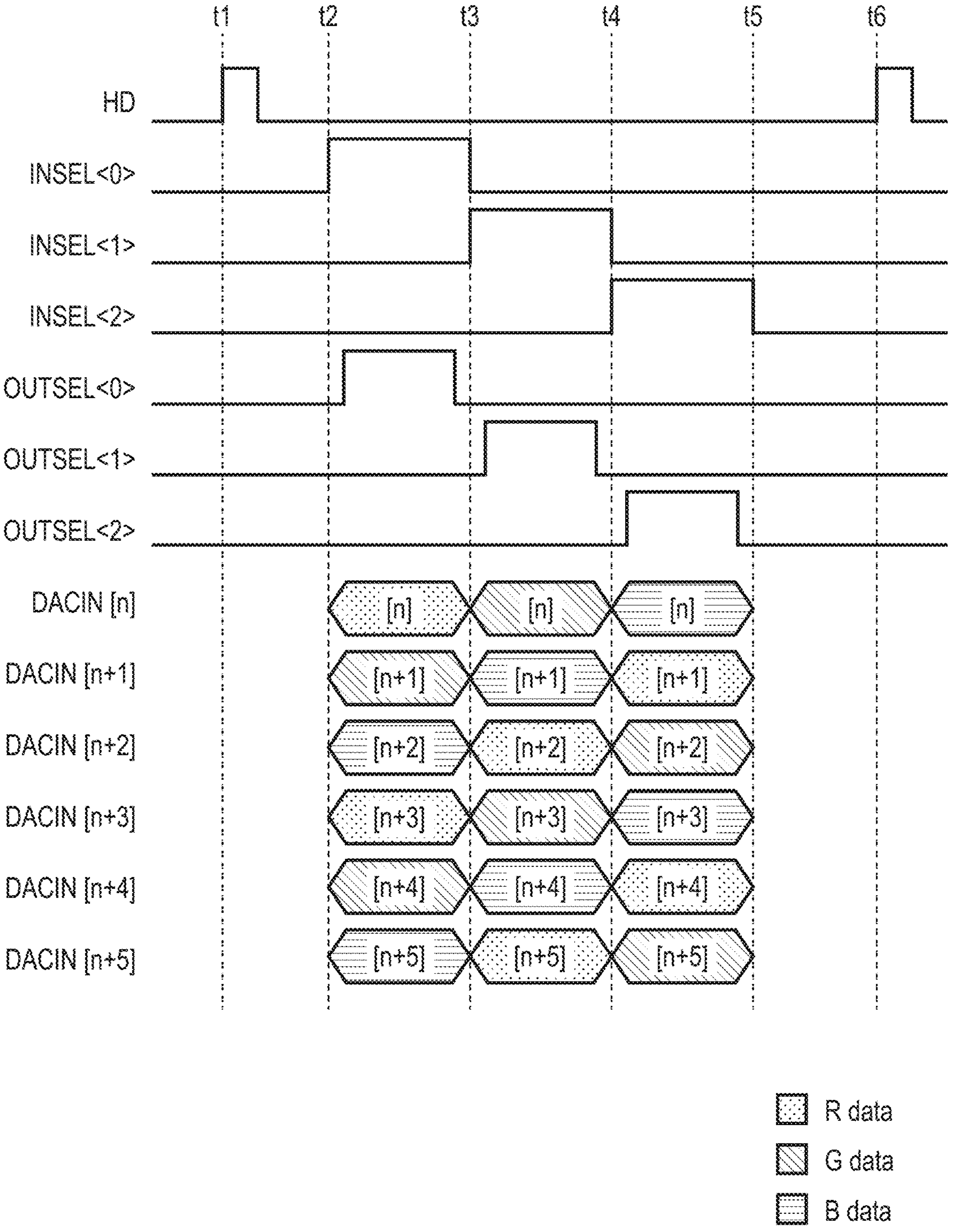
FIG. 5 is a timing chart according to the first embodiment.

For example, considering twelve column circuits, color data may be input to the DAC[n] to DAC[n+5] in the same order as the DAC[n] in FIG. 5, and color data may be input to the DAC[n+6] to DAC[n+11] in a different order. In addition, in this embodiment, the number of pieces of data of the same color input to the DAC[n] to DAC[n+5] at the same time is equal in the column direction, but it may not be equal.

Furthermore, in this embodiment, a configuration example has been shown in which one buffer circuit 701 and one DAC 801 are arranged for one pixel column, but a configuration in which multiple pixel columns are driven by one buffer circuit 701 and one DAC 801 may also be used. In this case, data of the same color may be consecutively input to the same DAC 801.

This embodiment has been described with respect to a case where data are simultaneously input to the DACs 801 in the same row, but the configuration of this embodiment is not limited to this. By reducing the number of the DACs 801 that simultaneously select the same color, the effect of reducing the influence of voltage fluctuations can be obtained. Even when different rows are driven at the same time, it is preferably configured such that color data of the same color are not input to the DACs at the same time as in this embodiment. For example, the pixel region may be divided into left and right blocks, and different rows may be respectively driven in these blocks. Even when different rows are respectively driven in all columns, it is preferably configured such that color data of the same color are not input to the DACs at the same time.

Second Embodiment

Figure 6:
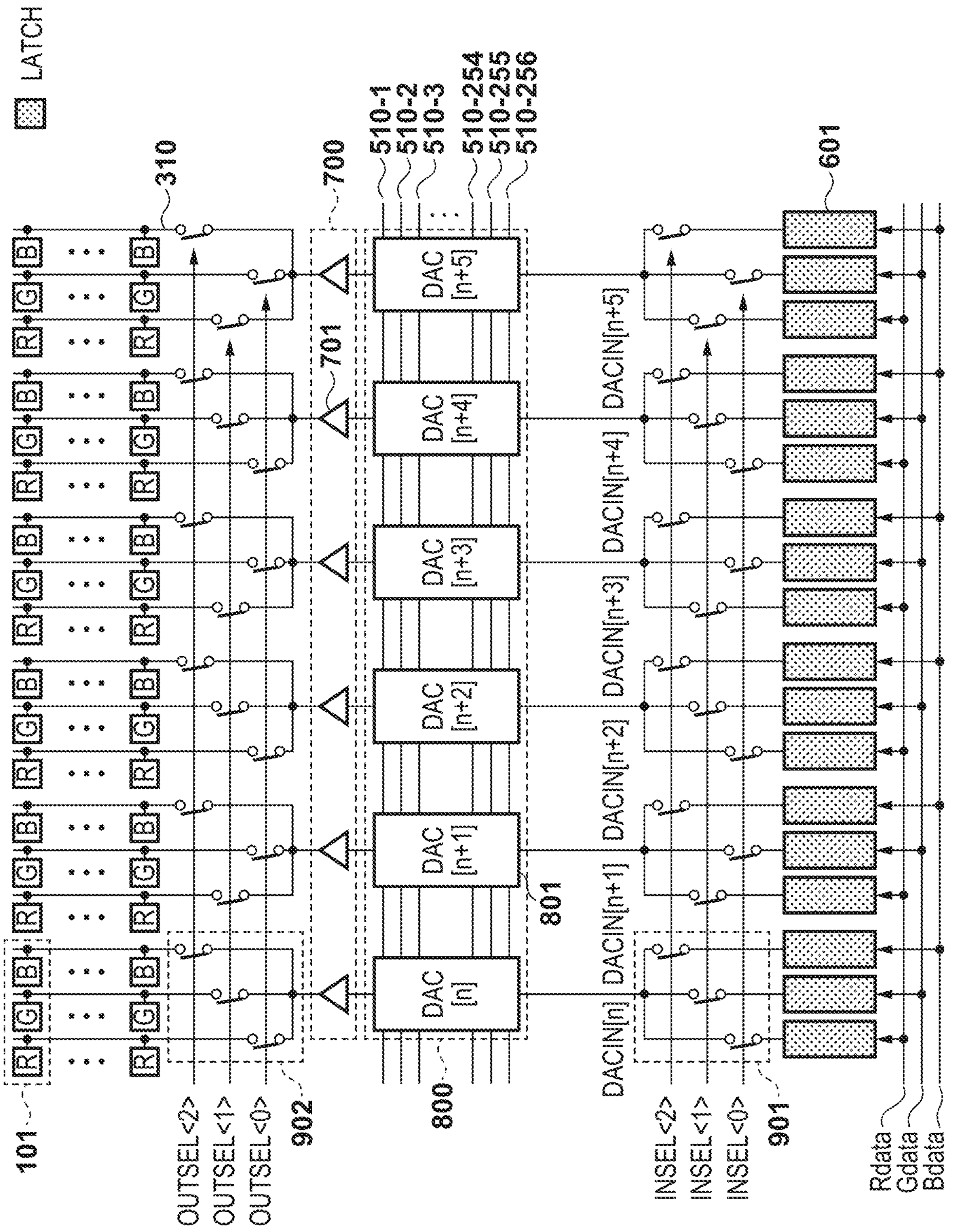
FIG. 6 is a view for explaining a column circuit according to the second embodiment.
Figure 7:
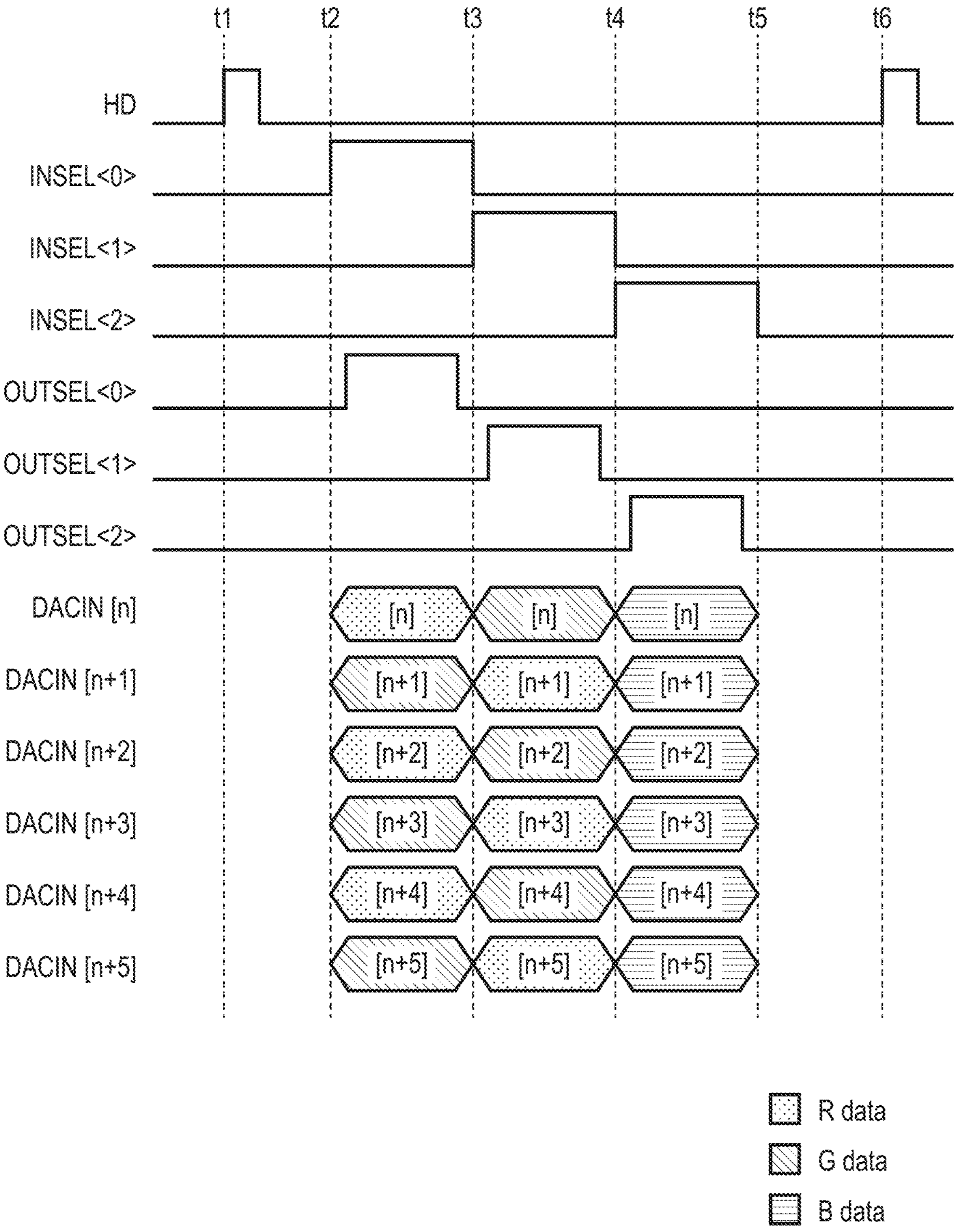
FIG. 7 is a timing chart according to the second embodiment.

The second embodiment shown in FIG. 6 will be described below. This embodiment is an example different from the first embodiment in that, when three color data are input to a DAC 801, two of them can be input. In this case, as shown in the timing chart of FIG. 7, at the timing when an INSEL<0> is set at high level at time t2, R data are input to a DAC[n], a DAC[n+2], and a DAC[n+4], and G data are input to a DAC[n+1], a DAC[n+3], and a DAC[n+5].

At the timing when an INSEL<1> is set at high level at time t3, the columns to input R data and the columns to input G data are switched. At the timing when an INSEL<2> is set at high level at time t4, B data are input to all columns at the same time. The relationship between the timings when each of the OUTSEL<0> to OUTSEL<2> transitions to high level and low level and the transition timings of each of the INSEL<0> to INSEL<2> is the same as that in the first embodiment. In this example, for R data and G data, the number of columns for the DACs 801 to which data of the same color are input at the same time is reduced. This can reduce the number of the DACs 801 that select the same reference voltage line 510 for the same color from reference voltage lines 510-1 to 510-256, so that the fluctuation of the reference voltage line 510 can be reduced.

In this embodiment, an example has been described in which two color data are R data and G data, but the color combination is not limited thereto. For example, a combination of R data and B data may be used. In general, R coloring is conspicuous, so that deterioration of display quality can be reduced simply by reducing the number of DACs 801 to which R data are input at the same time. In this embodiment, the arrangement and connection of switches and the control lines INSEL and OUTSEL therefor can be simplified as compared to the first embodiment, so that an increase in circuit area can be suppressed.

Third Embodiment

Figure 8:
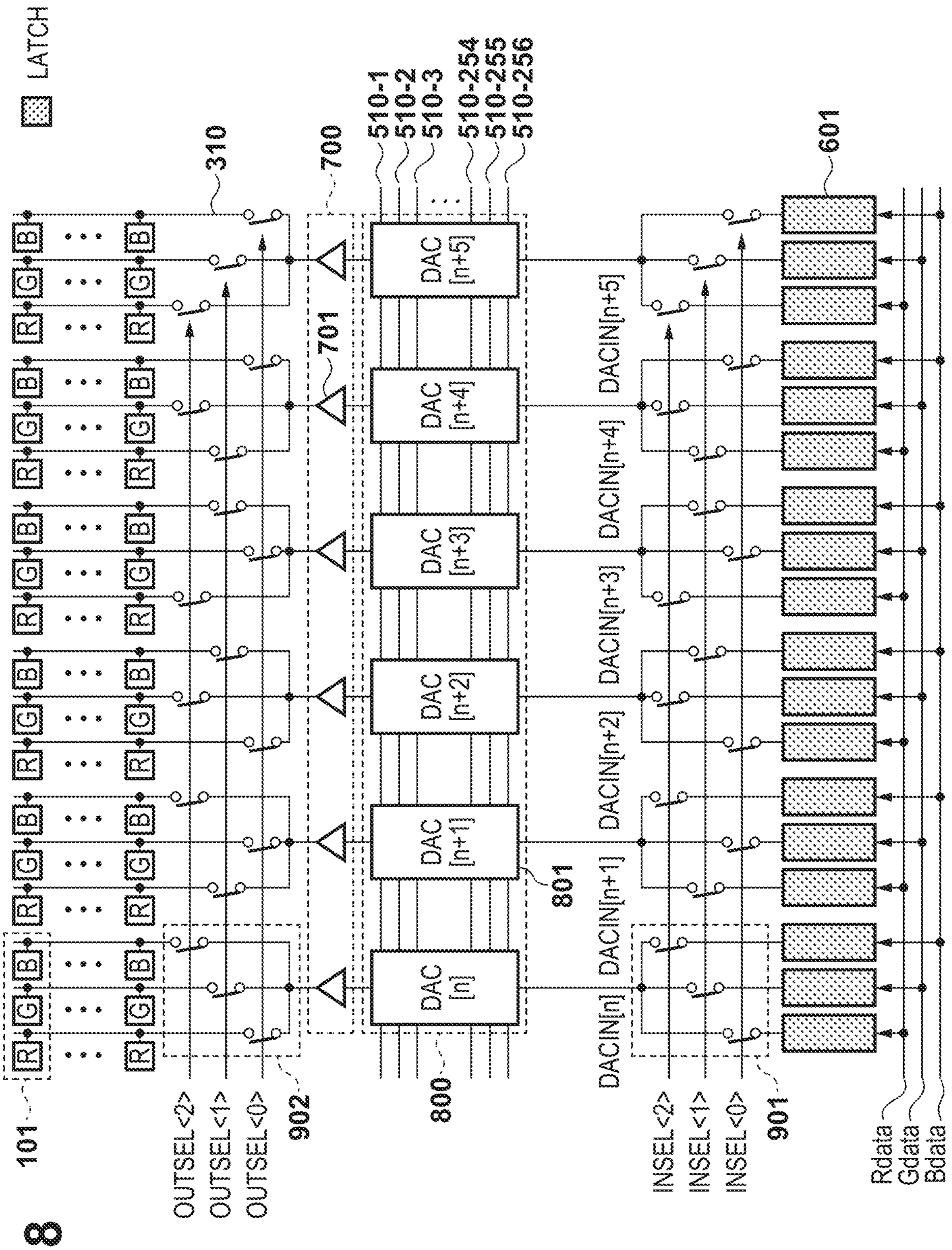
FIG. 8 is a view for explaining a column circuit according to the third embodiment.
Figure 9:
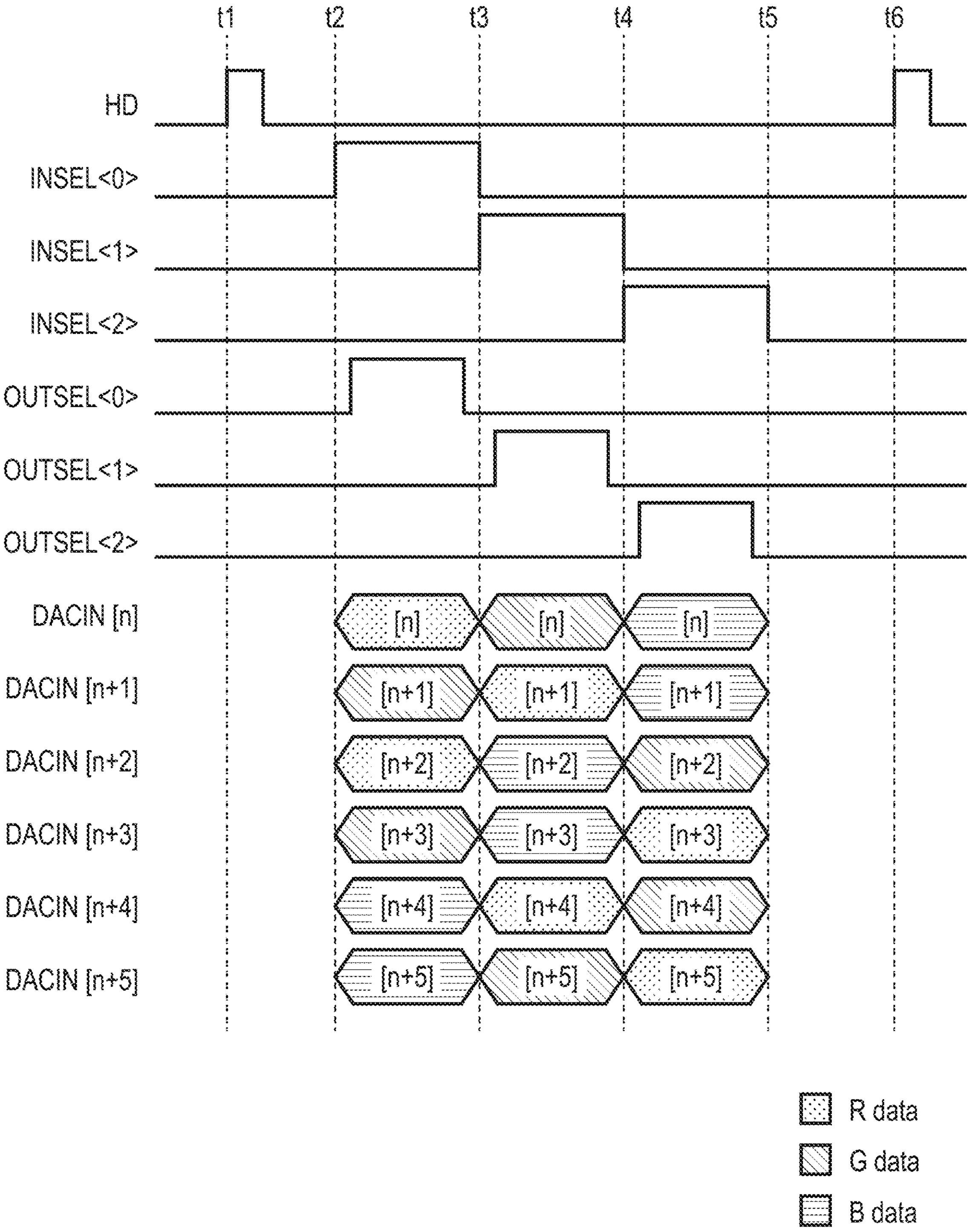
FIG. 9 is a timing chart according to the third embodiment.

The third embodiment shown in FIG. 8 will be described below. This embodiment is different from the first embodiment in that the order of R data, G data, and B data as color data to be input to a DAC 801 is different among a DAC[n] to a DAC[n+5]. FIG. 8 shows an example of the connection between latch circuits 601 and the DAC 801 and the connection between a buffer circuit 701 and signal lines 310. FIG. 9 is a timing chart of this configuration.

The transition timings of an INSEL<0> to an INSEL<2> and an OUTSEL<0> to an OUTSEL<2> to high level and low level in periods between time t2 and time t5 are similar to those in the first embodiment. In periods between time t2 and time t4, at the timing when each of the INSEL<0> to INSEL<2> is set at high level, R data, G data, and B data as color data are input to the DAC[n] to DAC[n+5] for two pixel columns each. Therefore, as described in the first embodiment, it is possible to reduce the voltage fluctuation in the selection operation of a reference voltage line 510 in the DAC 801.

Focusing on the input order of R data, G data, and B data as color data, the color data is input to the DAC[n] in the order of R data [n]→G data [n]→B data [n], while the color data is input to the DAC[n+1] with R data and G data in the reversed order. At this time, assume that R data [n] and R data [n+1] are the same data at the timing when the selection is switched from the INSEL<0> to the INSEL<1> at time t3. In this case, the DAC[n] is changed from a state in which one of reference voltage lines 510-1 to 510-256 is selected by a switch to a state in which the switch is turned off and the reference voltage line is unselected. On the other hand, in the DAC[n+1], the switch of the reference voltage line 510, which has been selected in DAC[n], is turned on and set in a selected state.

That is, one of the reference voltage lines 510-1 to 510-256 is simultaneously selected and unselected. At this time, considering that the feedthrough of the switch and the voltage transition of the control signal line such as the decode signal line shown in FIG. 4 may propagate from a parasitic capacitance to the reference voltage line 510, the voltage fluctuation of the reference voltage line 510 is canceled by performing a reverse operation of the selection/unselection. Furthermore, G data and B data are input to the DAC[n+2] in the reversed order of G data [n] and B data [n] input to the DAC [n]. With this, when the G data and B data are the same, a canceling effect can be obtained by a similar voltage fluctuation of the reference voltage line 510. Regarding the effect of canceling the voltage fluctuation due to the order of color data input to the DAC 801 as described above, when considering combinations for all colors, the combinations are based on the order of colors in the DAC[n] to DAC[n+5] in the example of this embodiment.

As a result, when R data, G data, and B data as color data to be input are respectively the same data in the DAC[n] to DAC[n+5], the voltage fluctuation is canceled, and a state in which there is almost no voltage fluctuation can ideally be achieved. Adjacent pixels usually tend to have the same data. In this embodiment, a configuration example of six adjacent DACs 801 has been described, but the present invention is not limited to this. For example, multiple DACs 801 may be considered as one block. The input order of R data, G data, and B data as color data may be the same in the same block, and the color data may be changed between blocks to achieve the effect of canceling the voltage fluctuation. In addition, similar to the first embodiment, this embodiment has been described as a configuration example in which the same row is driven, but the present invention is not limited to this. Even when driving different rows, the voltage fluctuation of the reference voltage line 510 is reduced, so that the display quality can be improved.

Fourth Embodiment

Figure 10:
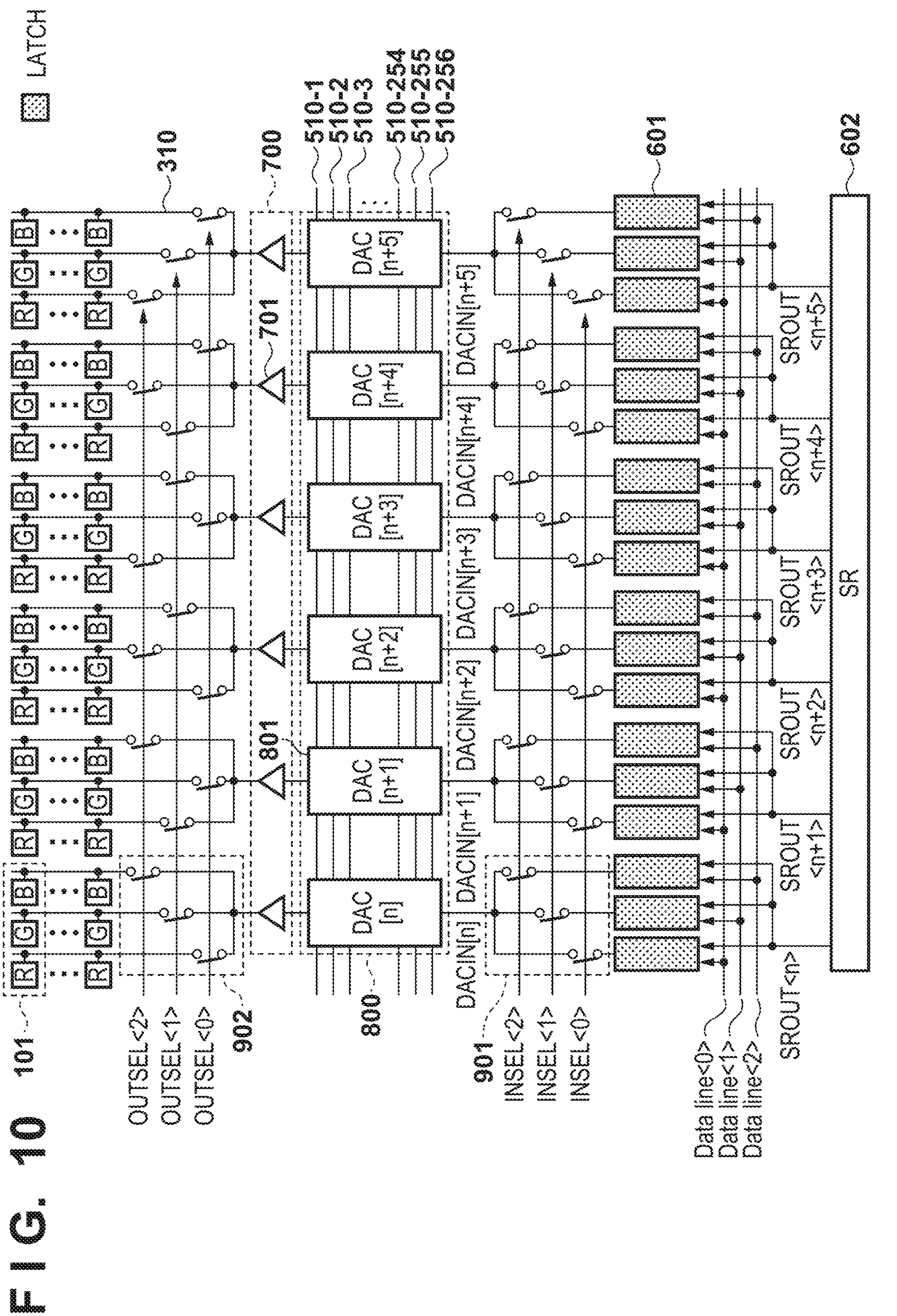
FIG. 10 is a view for explaining a column circuit according to the fourth embodiment.

The fourth embodiment will be described below. FIG. 10 shows a configuration example according to this embodiment. In the first to third embodiments described so far, each of R data, G data, and B data as color data to be input to the latch circuit 601 is output to the latch circuit 601 from a wiring provided for each color. In this embodiment, R data, G data, and B data are mixed within input data wirings Dataline<0> to Dataline<2>. Data can be output from latch circuits 601 in each column in the same order as in FIG. 9. Switches functioning as a selection circuit 901 connecting a DAC 801 and the latch circuits 601 are arranged in the same pattern for a DAC[n] to a DAC[n+5]. The latch circuit 601 is connected to the data wirings Dataline<0> to Dataline<2>.

The timings at which R data, G data, and B data as data of respective colors are written in the latch circuit 601 are controlled by pulses of strobe outputs (SR_OUT<n> to SR_OUT<n+5>) output from a shift register circuit 602. More specifically, writing is controlled at the timing when each of the SR_OUT<n> to SR_OUT<n+5> falls from high level to low level. In this case, the SR_OUT and the DAC number correspond to each pixel column number. For example, the SR_OUT<n> controls writing in the latch circuit 601 connected to the DAC[n]. The SR_OUT<n+1> to SR_OUT<n+5> also correspond to the DAC[n+1] to DAC [n+5], respectively.

Figure 11:
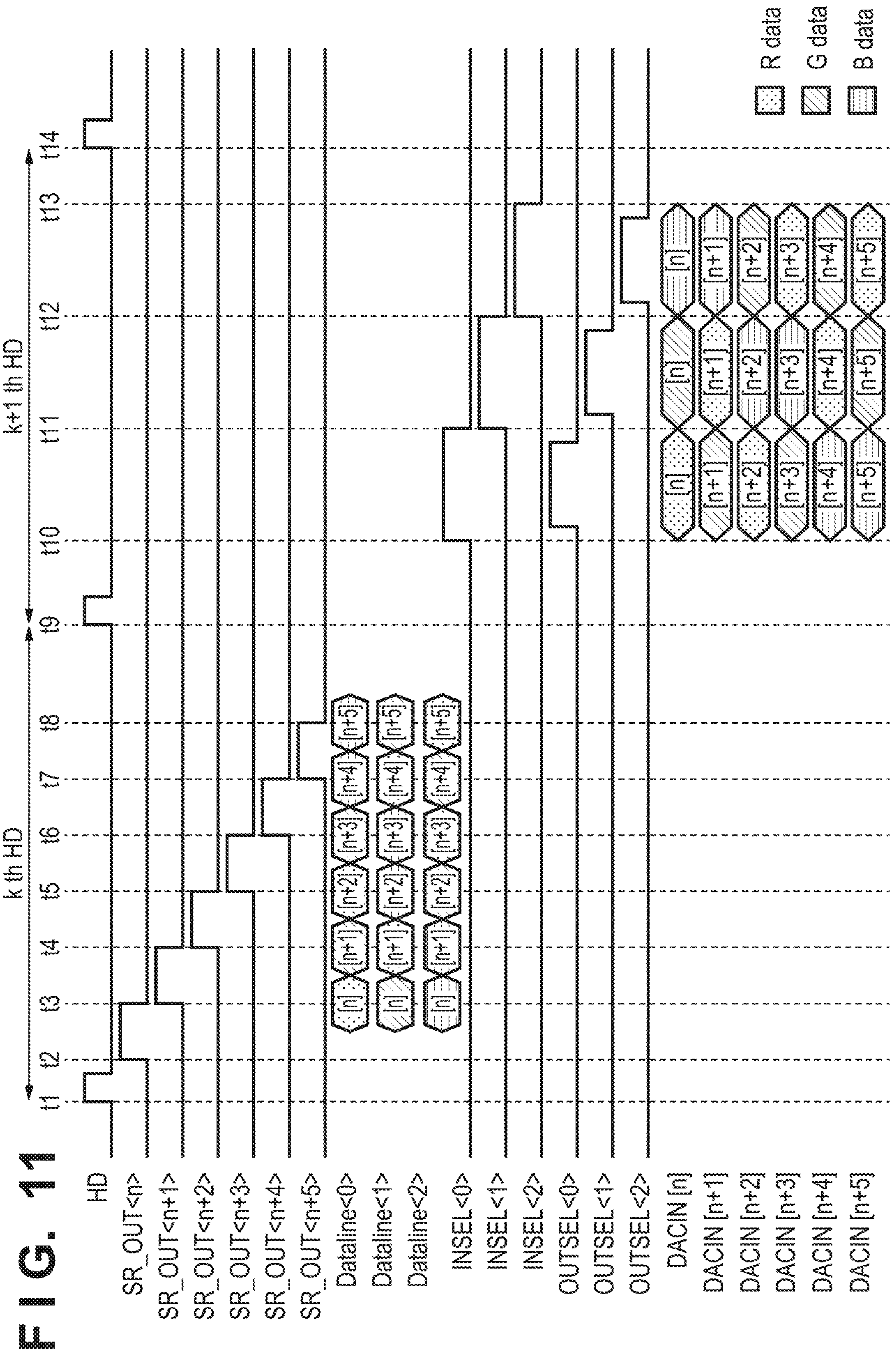
FIG. 11 is a timing chart according to the fourth embodiment.

FIG. 11 shows a detailed timing chart. The period from time t1 to time t9 is the kth HD period, and the period from time t9 to time t14 is the (k+1)th HD period. In the kth HD period, an HD signal is set at high level at time t1, and the operation of writing the display data for the kth row in the respective latch circuits 601 is started.

At time t2, the SR_OUT<n> is set at high level, and data writing to the latch circuits 601 in the nth pixel column starts. While the SR_OUT<n> is at high level, R data<n> (R[n]) starts to be input to the Dataline<0>, G data<n> (G[n]) starts to be input to the Dataline<1>, and B data<n> (B[n]) starts to be input to the Dataline<2>. At time t3 when the SR_OUT<n> is set at low level, the R data<n>, the G data<n>, and the B data<n> are respectively written in the latch circuits 601 in the nth pixel column. At the same time, the next column signal SR_OUT<n+1> of the shift register circuit 602 is set at high level.

While the SR_OUT<n+1> is at high level, data to be written in the latch circuits 601 in the (n+1)th pixel column start to be input to the Dataline<0> to Dataline<2>. G data<n+1> (G[n+1]) is input to the Dataline<0>, R data<n+1> (R[n+1]) is input to the Dataline<1>, and B data<n+1> (B[n+1]) is input to the Dataline<2>.

At time t4, at the timing when the SR_OUT<n+1> is set at low level, data are written in the respective latch circuits 601 for the (n+1)th pixel column. Also, at time t5 to time t8 when the SR_OUT<n+2> to SR_OUT<n+5> are set at low level, R data, G data, and B data as color data are mixed on the same Dataline, as shown in FIG. 11. At this time, the data to be input to the Dataline<0> to Dataline<2> are switched to the next pixel column data while the SR_OUT<n+2> to SR_OUT<n+5> are at high level, similar to the SR_OUT<n> and the SR_OUT<n+1>.

The transition timings of the SR_OUT<n+1> to SR_OUT<n+5> to high level and low level at time t4 to time t7 are the same as those at time t3. Similar to time t3, the next SR_OUT signal is set at high level at the timing when the SR_OUT signal for the previous pixel column is set at low level. However, as long as desired data is written in each latch circuit 601 at the timing when the SR_OUT signal is set at low level, the timings need not be the same.

The data input cycle for the Dataline<0> to Dataline<2> is desirably shifted from that for the SR_OUT<n> to SR_OUT<n+5> by a half cycle as shown in FIG. 11. However, as long as desired data is written in each latch circuit 601, the shift is not limited to a half cycle. At time t9, the HD signal is set at high level, the next (k+1)th HD period starts, and a signal write operation for the (k+1)th row is performed. Here, the relationship between the transition timings of the INSEL<0> to INSEL<2> and the transition timings of the OUTSEL<0> to OUTSEL<2> at time t10 to time t13 is the same as that in the first embodiment.

In period between time t10 and time t13, data are input to the DAC[n] to DAC[n+5] of the DACs 801. The timings are the same as in the third embodiment. At the timing when the DAC 801 and the latch circuit 601 are connected by each of the INSEL<0> to INSEL<2>, color data R data, G data, and B data to be input to the DAC[n] to DAC[n+5] are mixed. Since data of the same color are not input to the DACs 801 in all columns at the same time, the fluctuation of the reference voltage line 510 can be reduced.

As in the third embodiment, the effect of canceling the fluctuation of the reference voltage line 510 can be obtained by the input order of R data, G data, and B data as color data at the timings when the input data of the INSEL<0> to INSEL<2> are switched at time t11 and time t12. Furthermore, in this embodiment, R data, G data, and B data as color data input from the input data wirings Dataline<0> to Dataline<2> of the latch circuits 601 are mixed for each time. This configuration prevents that data of the same color are input to the DAC[n] to DAC[n+5] at the same time. When the wiring of data input to the latch circuit 601 is common for each color data as in the first to fourth embodiments, the connections of switches between the latch circuits 601 and the DAC 801 to the INSEL<0> to INSEL<2> for controlling the switches need to be made asymmetrical pattern. However, this is unnecessary in this embodiment, so that the connections in each column can be patterned. Hence, it is possible to reduce the fluctuation of the reference voltage line 510 while suppressing an increase in circuit size and complication.

In this case, as long as data of the same color are not input to all columns at the same time as data input to the DAC[n] to DAC[n+5], the color order of data input to the Dataline<0> to Dataline<2> is not limited to that in this embodiment. The same color may be consecutive in the time direction. The order of color data input to the DAC 801 in this embodiment is the same as that in the third embodiment, but the present invention is not limited thereto. The color combinations given as examples in the first to fourth embodiments may also be used.

Fifth Embodiment

Figure 12:
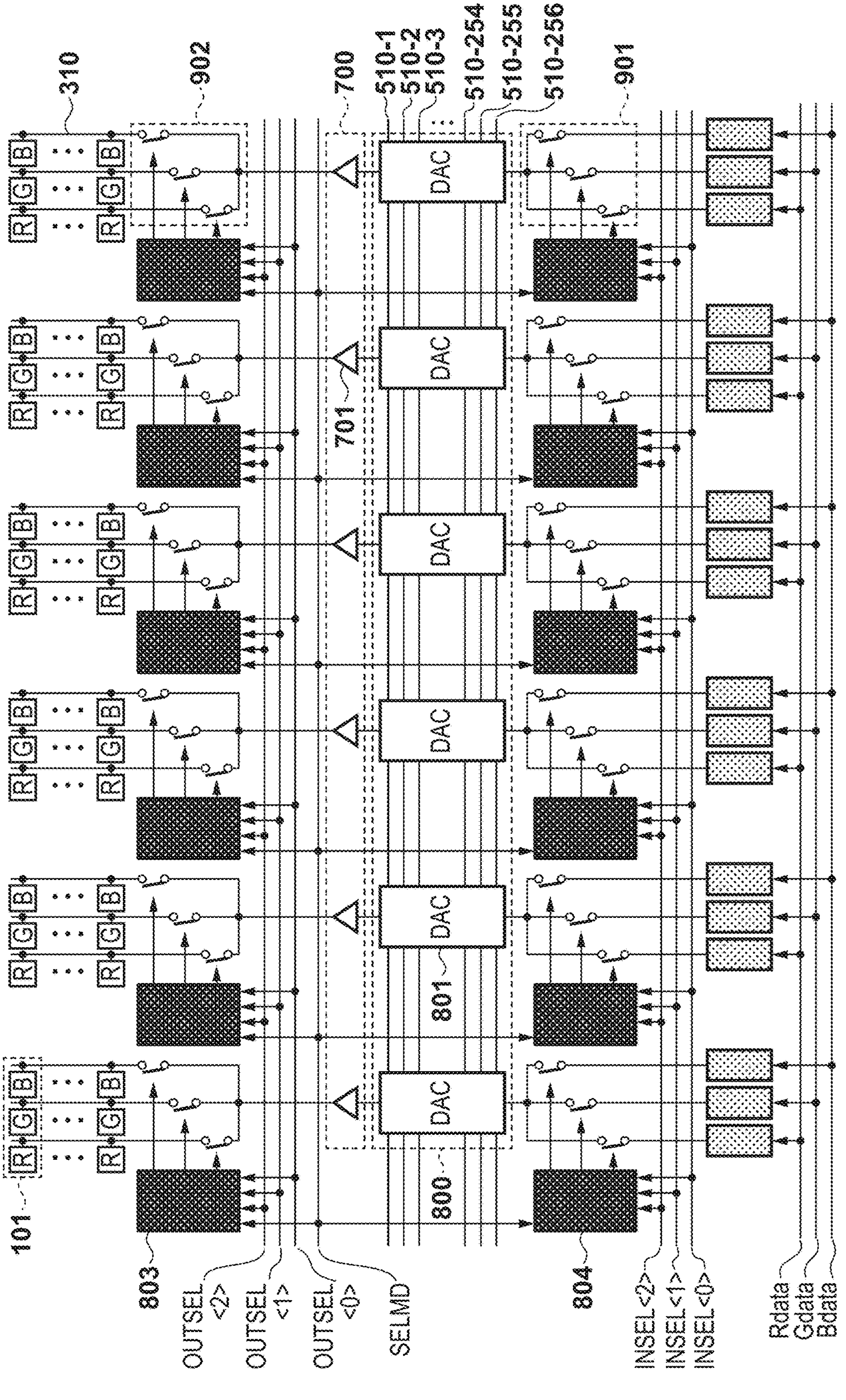
FIG. 12 is a view for explaining a column circuit according to the fifth embodiment.

The fifth embodiment will be described below. FIG. 12 shows a configuration example according to this embodiment. In this embodiment, a mode selection circuit (SELMODE circuit) 804 configured to select an operation mode is added between switches and an INSEL<0> to an INSEL<2> that control the connection between a DAC 801 and latch circuits 601. In addition, a SELMODE circuit 803 is added between switches and OUTSEL<0> to OUTSEL<2> that control the connection between a buffer circuit 701 and signal lines 310. The SELMODE circuits 803 and 804 can switch the control modes of the INSEL<0> to INSEL<2> and the OUTSEL<0> to OUTSEL<2> by a mode selection signal (SELMD).

Figure 13:
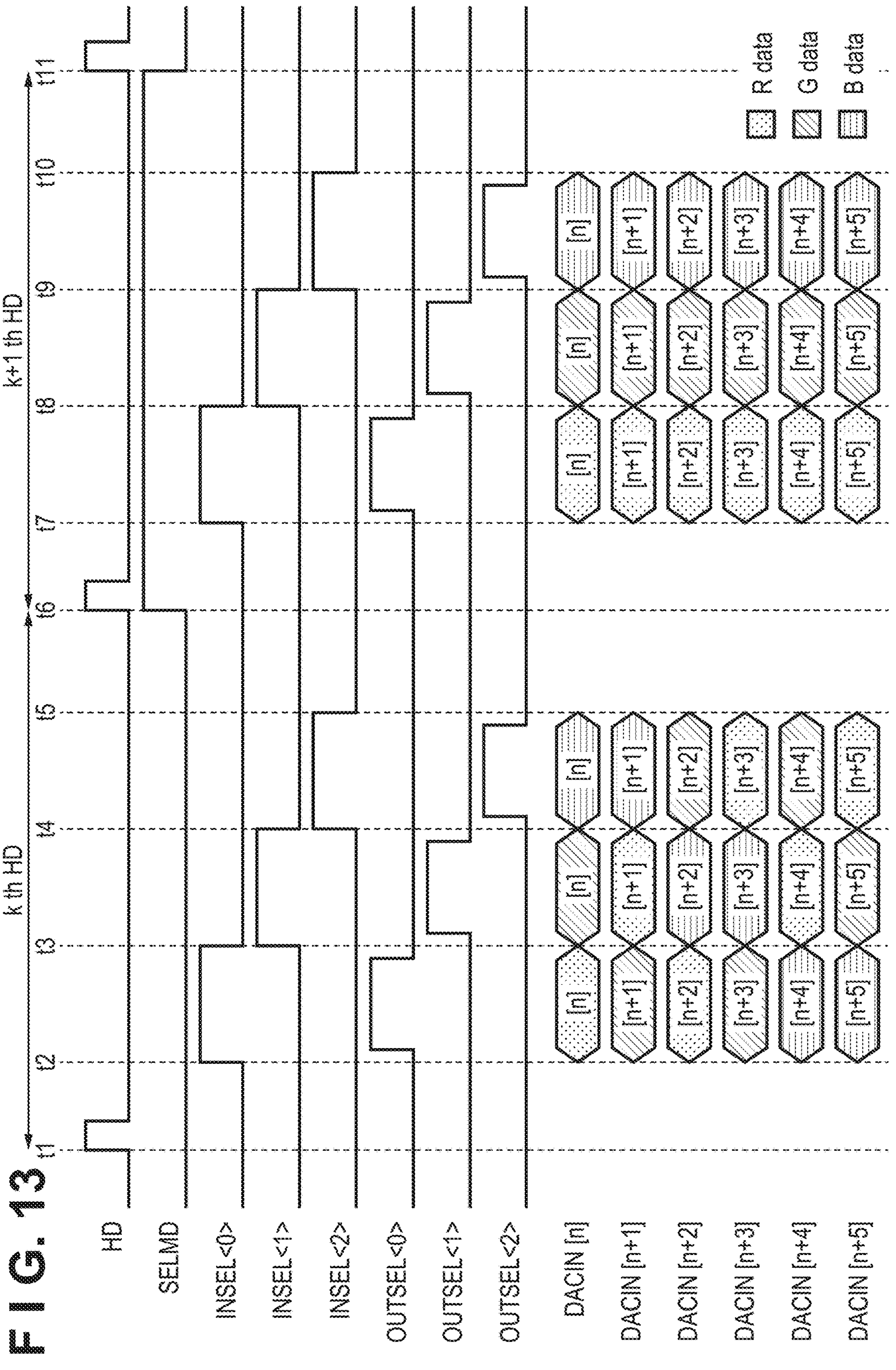
FIG. 13 is a timing chart according to the fifth embodiment.

At this time, the transition timings of the INSEL<0> to INSEL<2> to high level and low level and the transition timings of the OUTSEL<0> to OUTSEL<2> are the same as those in the first embodiment regardless of the control mode. FIG. 13 shows the difference between the control modes according to the SELMD. For example, the first mode is shown which is executed when the SELMD is at low level during the mth HD period starting at time t1. The second mode is also shown which is executed when the SELMD is at high level during the (m+1)th HD period starting at time t6. Note that, for simplicity, an example is shown in which the transition occurs in successive HD periods, but the present invention is not limited thereto.

The SELMD may be at low level or high level throughout all HD periods in one display frame. Then, the color data input to a DAC[n] to a DAC[n+5] of the DACs 801 are controlled such that R data, G data, and B data are input in order at time t2 to time t5 in the period when the SELMD is at low level. However, the order of R data, G data, and B data as color data to be input to a DAC 801 is different among a DAC[n] to a DAC[n+5]. On the other hand, at time t7 to time t10 in the period when the SELMD is at high level, control is performed such that color data of the same color are input to all of the DAC[n] to DAC[n+5] at the same time. For example, R data are input while the INSEL<0> is at high level, G data are input while the INSEL<1> is at high level, and B data are input while the INSEL<2> is at high level.

This operation is against the operation for reducing the voltage fluctuation of the reference voltage line 510 in the DAC 801 described in the first to fourth embodiments, and data of the same color are input to all the DACs 801 at the same time. This can suppress deterioration of image quality in certain special scenes. How to properly use the operation of switching the SELMD between high level and low level will be described below. When the SELMD is at High level, data of the same color are input to all the DACs 801. This has an effect of suppressing coloring in a scene such as a night scene.

Figure 14:
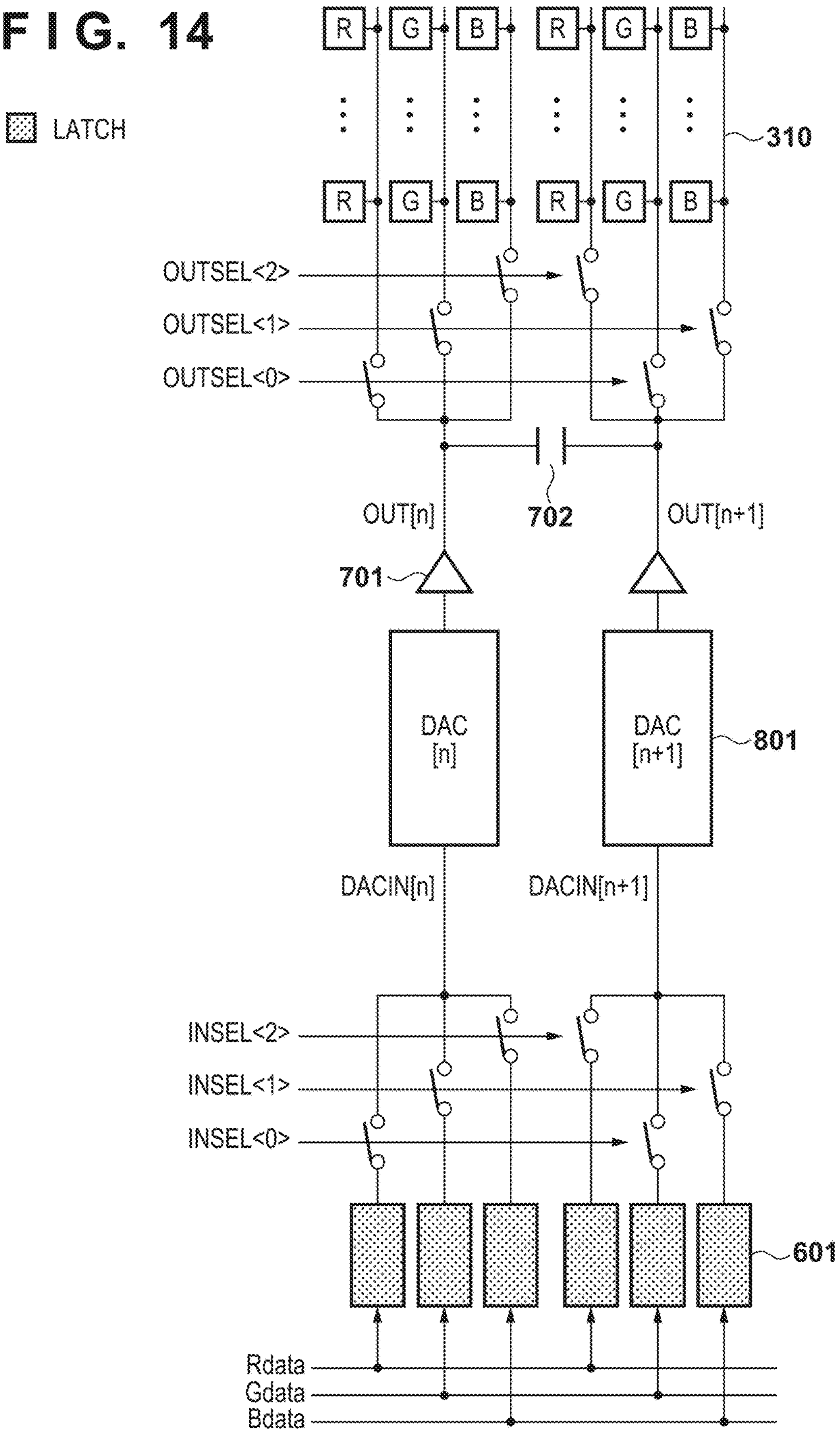
FIG. 14 is a view for explaining the column circuit according to the fifth embodiment.
Figure 15:
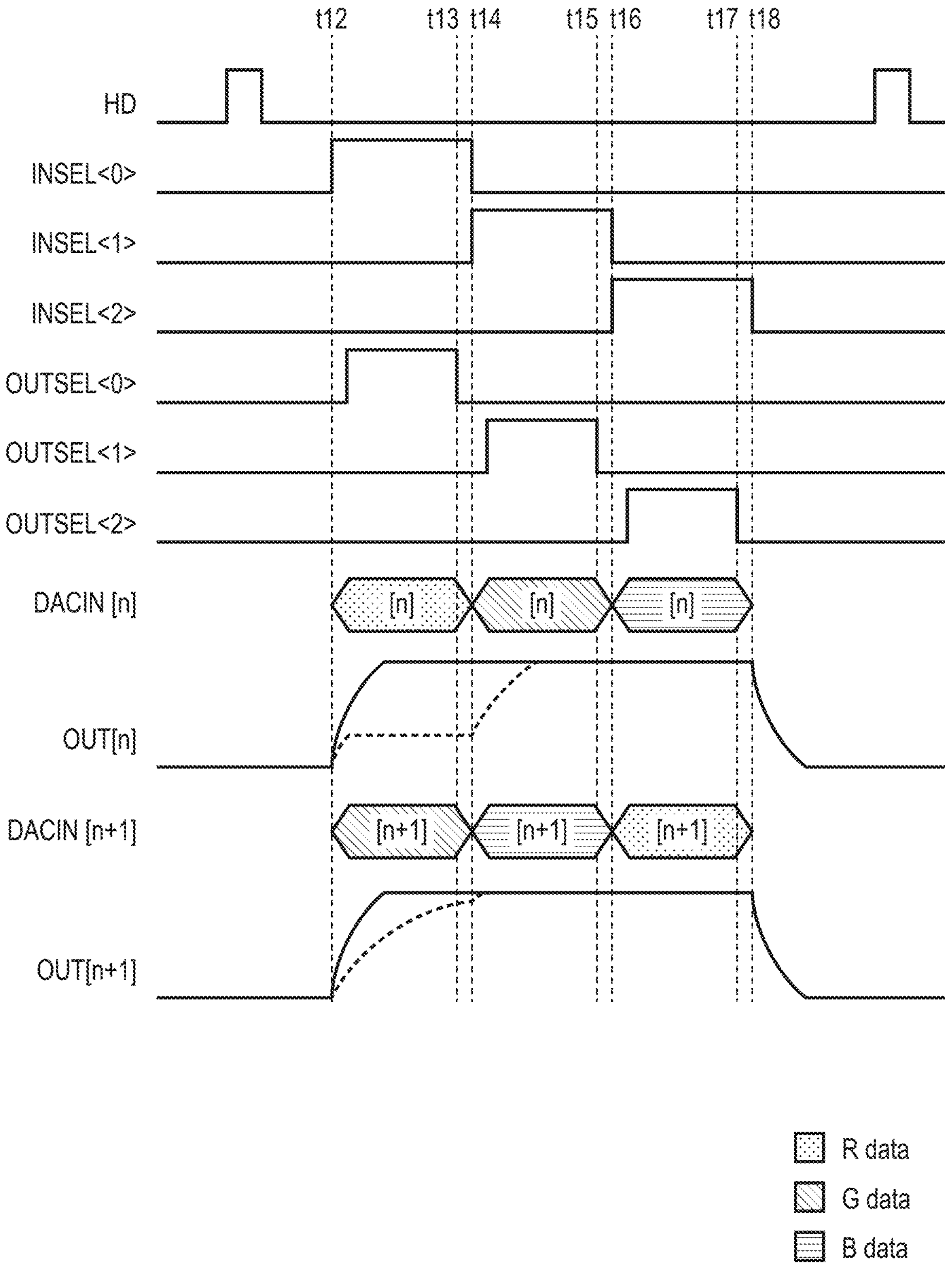
FIG. 15 is a timing chart according to the fifth embodiment.

With reference to FIG. 14, two columns of the DAC[n] and the DAC[n+1] of the DACs 801 will be described as an example. At this time, if pixels 101 are miniaturized, the pitch of the DACs 801 and the pitch of the buffer circuits 701 are narrowed, and the parasitic capacitance between adjacent circuits increases. Since the output of the buffer circuit 701 naturally has a parasitic capacitance 702, the buffer circuit 701 needs to drive the parasitic capacitance as well. With reference to FIG. 15, respective timings and the transition of the signal voltage of each of outputs OUT[n] and OUT[n+1] of the buffer circuits 701 will be described. When the difference in output voltage between adjacent pixels is small, in a case of all black display, the INSEL<0> is set at high level at time t12, and thereafter the OUTSEL<0> is set at high level. At the timing when writing of the signal voltage in the signal line 310 starts, the OUT[n] and the OUT[n+1] rise up to the same signal voltage of the black emission level between adjacent circuits as indicated by solid lines, so the change of charges held in the parasitic capacitance 702 between adjacent circuits is small.

Subsequently, the signal voltages remain at the same black display level at time t14 to time t18, so that the voltages do not change as indicated by the solid lines. Accordingly, at the timings when the OUTSEL<0> to OUTSEL<2> are set at low level at time t13, time t15, and time t17, the desired signal voltage of the black display level is written in the signal line 310. On the other hand, in a case where only one R pixel in the nth pixel column emits light, at time t12, the OUT[n] is a signal voltage of the emission luminance level which is a lower voltage than the black emission level, as indicated by a dotted line. On the other hand, for the adjacent OUT[n+1], a signal voltage of the black emission level is written. However, since the differential voltage from the OUT[n] needs to be written in the parasitic capacitance 702, the driving load of the buffer circuit 701 increases and the voltage settlement time becomes longer, as indicated by a dotted line.

When the OUTSEL<0> is set at low level at time t13, the signal voltage has not settled sufficiently. Accordingly, not the desired voltage for black display but a slightly lower signal voltage is written in the signal line 310, causing black floating. In this case, since the OUT[n+1] is writing the signal voltage for the G pixel, the G pixel also emits light although only the R pixel should emit light. At time t14, the INSEL<1> is set at high level, G data [n] and B data [n+1] as the next color data are input, and the OUT[n] and OUT[n+1] rise up to the signal voltage of the black display level. At time t15, the OUTSEL<1> is set at low level, and the desired signal voltage of the black display level is written in the signal line 310.

At time t16, data are switched to B data [n] and R data [n+1] as the next color data. Since the signal voltage does not change, the voltage remains constant. At the timing when the OUTSEL<2> is set at low level at time t17, the desired voltage is written in the signal line 310. In this manner, in a case where a nearly black display region like a night scene occupies the background, and a given pixel emits light, the signal voltage may not settle at the desired voltage due to the parasitic capacitance between the adjacent circuits, and conspicuous local coloring may occur. For such a special scene, it is desirable to output the same color from the buffer circuits 701 at the same time.

In this embodiment, assume that G data [n+1] is switched to R data [n+1]. In this case, since the voltage change of the OUT [n+1] is as indicated by the dotted line, coloring of the R pixel occurs, but this is inconspicuous because the coloring is the same color as the light emission color. On the other hand, in a scene in which white such as clouds during the day is displayed, the driving as described in the above embodiment is suitable from the viewpoint of suppressing coloring of the display caused by the voltage fluctuation of the reference voltage line 510.

As described above, in a particular display scene, switching the driving mode to input color data of the same color can maintain the display quality in each scene. Regarding mode selection, it is sufficient that, as the display mode, the SELMD can be set at high level when displaying a night scene, and the SELMD can be set at low level otherwise. There is no limitation on switching of the settings. It is also possible to use a configuration in which whether the input data is for nearly black display is determined and the SELMD is automatically switched. For example, the control circuit 400 shown in FIG. 1 may be provided with a data processing function. In this embodiment, the pixel 101 emits light with a high luminance when the voltage is low, but the polarity may be reversed.

Application Examples of Light Emitting Device

Figure 16A:
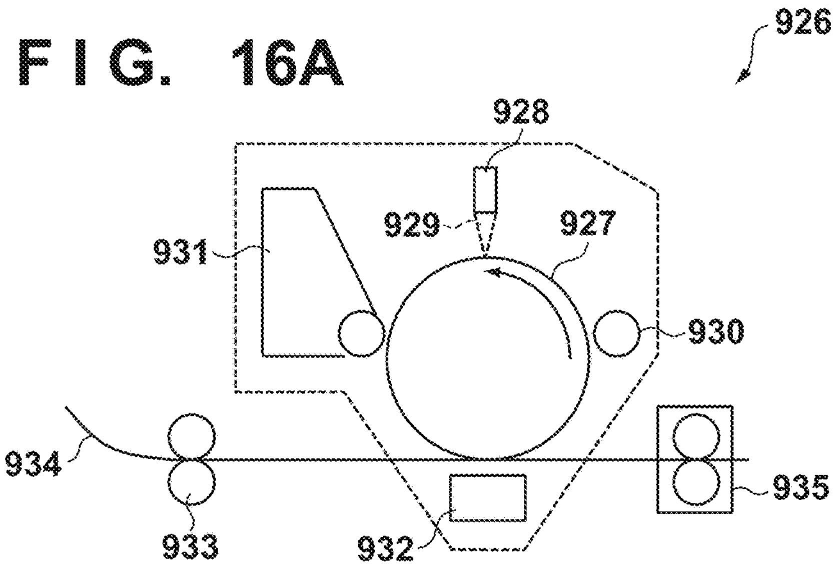
FIGS. 16A to 16C are schematic views showing an example of an image forming device according to an embodiment of the present invention.
Figure 16B:
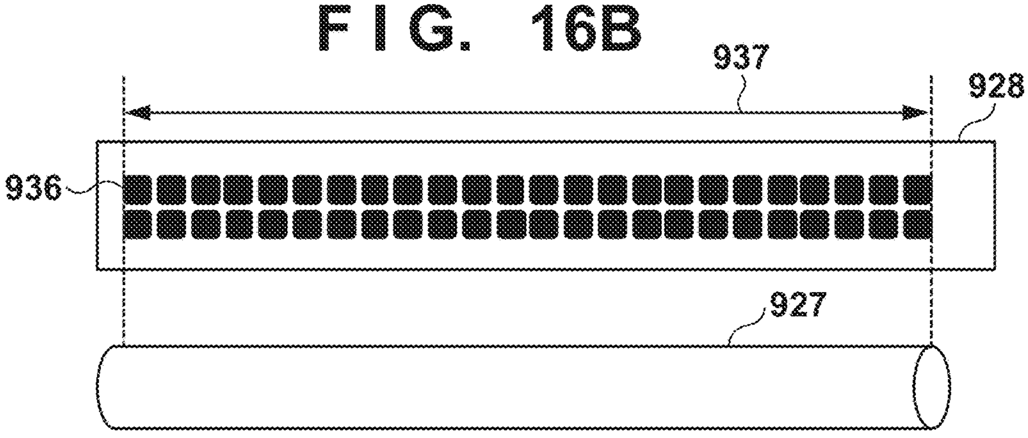
Figure 16C:
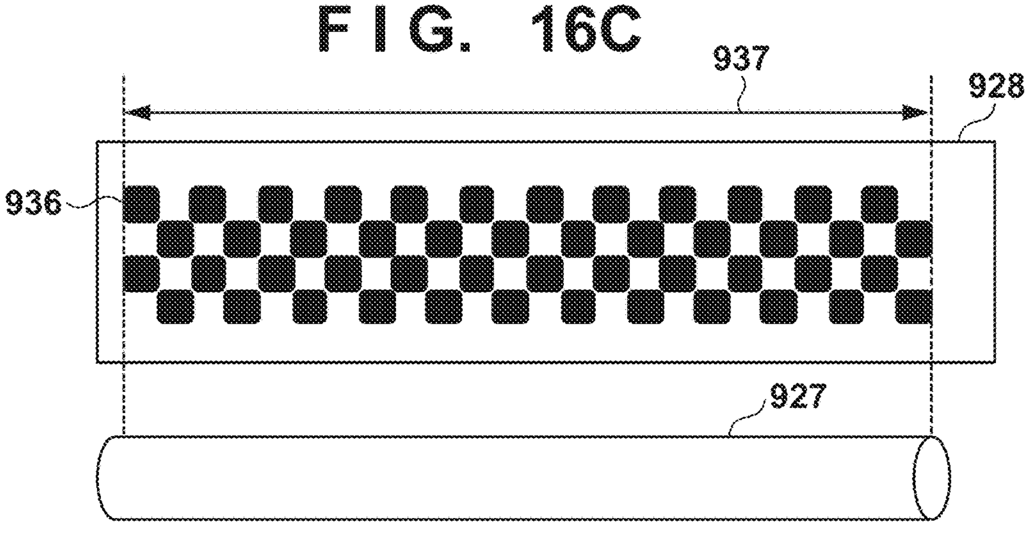

Examples in which the light emitting device according to each of the above-described first to fifth embodiments is applied to an apparatus will be described below. An organic light emitting element is preferably used as the light emitting element. FIGS. 16A to 16C show an image forming device according to this embodiment. FIG. 16A is a schematic view of an image forming device 926 according to this embodiment. The image forming device includes a photosensitive member 927, an exposure light source 928, a developing device 931, a charging unit 930, a transfer device 932, a conveyance unit 933, and a fixing device 935.

Light 929 is emitted from the exposure light source 928, and an electrostatic latent image is formed on the surface of the photosensitive member 927. The exposure light source includes the light emitting device according to each of the first to fifth embodiments. The developing device 931 includes a developing agent such as a toner, and applies the developing agent to the exposed photosensitive member 927. The charging unit 930 charges the photosensitive member 927. The transfer device 932 transfers the developed image to a print medium 934. The conveyance unit 933 conveys the print medium 934. The print medium 934 is, for example, paper. A fixing device 935 fixes the image formed on the print medium.

Each of FIGS. 16B and 16C is a schematic view showing a form in which a plurality of light emitting portions 936 are arranged in the exposure light source 928 on a long substrate. Arrow 937 indicates a direction parallel to the axis of the photosensitive member, which represents a column direction in which light emitting elements are arrayed. An organic light emitting element can be used as the light emitting element. This column direction matches the direction of the axis upon rotating the photosensitive member 927. This direction can also be referred to as the long-axis direction of the photosensitive member.

FIG. 16B shows a form in which the light emitting portions are arranged along the long-axis direction of the photosensitive member. FIG. 16C shows a form which is different from that shown in FIG. 16B and in which the light emitting portions are arranged in the column direction alternately between the first column and the second column. The light emitting portions are arranged at different positions in the row direction between the first column and the second column.

As for the light emitting portions shown in FIG. 16C, the plurality of light emitting portions are arranged apart from each other in the first column. In the second column, the light emitting portion is arranged at the position corresponding to the space between the light emitting portions in the first column. That is, in the row direction as well, the plurality of light emitting portions are arranged apart from each other.

The arrangement shown in FIG. 16C can be referred to as, for example, an arrangement in a grid pattern, an arrangement in a staggered pattern, or an arrangement in a checkered pattern.

Figure 17:
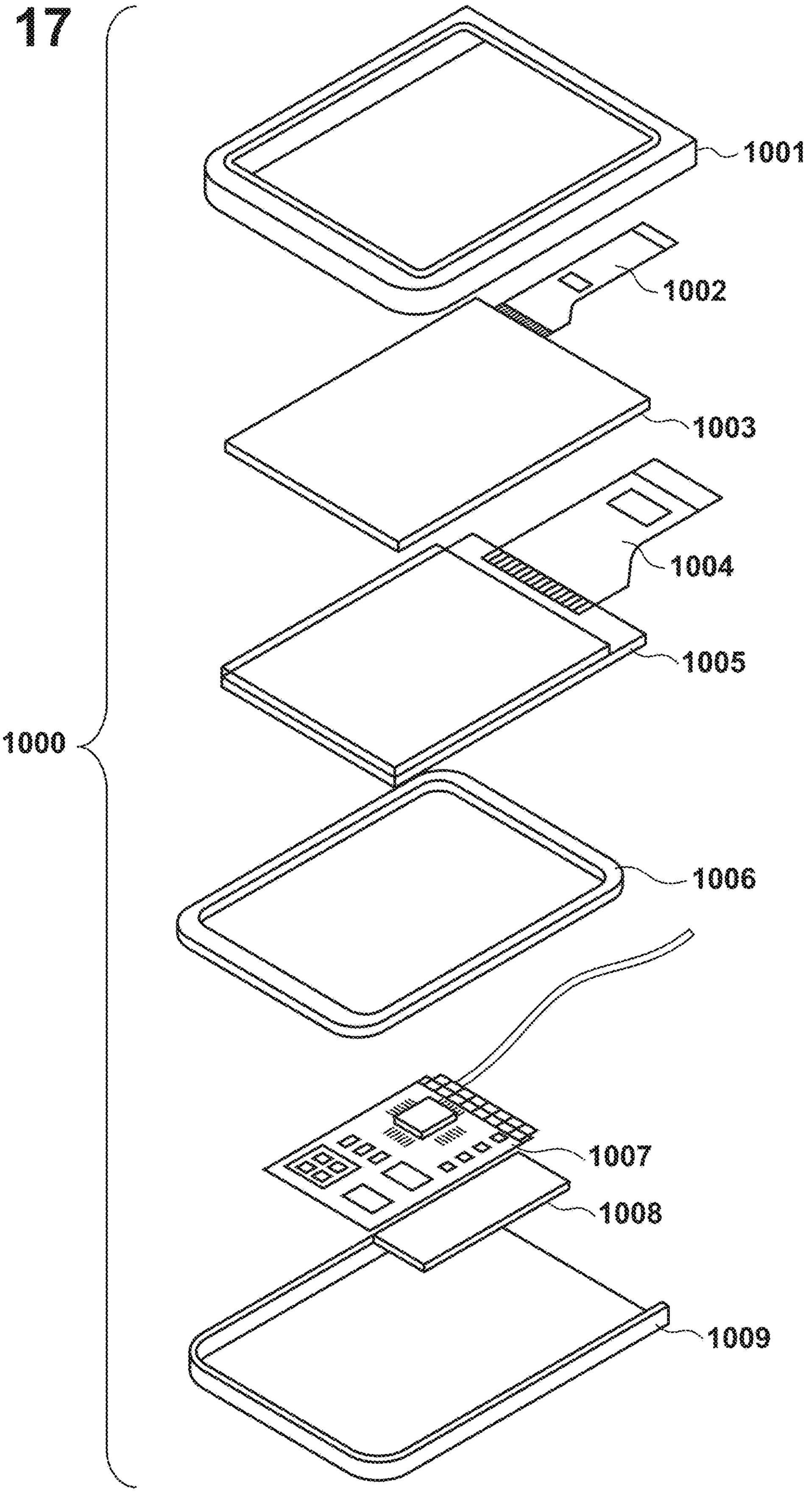
FIG. 17 is a schematic view showing an example of a display device according to an embodiment of the present invention.

FIG. 17 is a schematic view showing an example of a display device that can use the light emitting device according to each of the above-described first to fifth embodiments. A display device 1000 can include a touch panel 1003, a display panel 1005, a frame 1006, a circuit board 1007, and a battery 1008 between an upper cover 1001 and a lower cover 1009. Flexible printed circuits (FPCs) 1002 and 1004 are respectively connected to the touch panel 1003 and the display panel 1005. Transistors are arranged on the circuit board 1007. The battery 1008 is unnecessary if the display device is not a portable apparatus. Even when the display device is a portable apparatus, the battery 1008 may be provided at another position.

The display device according to this embodiment can include color filters of red, green, and blue. The color filters of red, green, and blue can be arranged in a delta array.

The display device according to this embodiment can also be used for a display unit of a portable terminal. At this time, the display unit can have both a display function and an operation function. Examples of the portable terminal are a portable phone such as a smartphone, a tablet, and a head mounted display.

The display device according to this embodiment can be used for a display unit of an image capturing device including an optical unit having a plurality of lenses, and an image capturing element for receiving light having passed through the optical unit. The image capturing device can include a display unit for displaying information acquired by the image capturing element. In addition, the display unit can be either a display unit exposed outside the image capturing device, or a display unit arranged in the finder. The image capturing device can be a digital camera or a digital video camera.

Figure 18A:
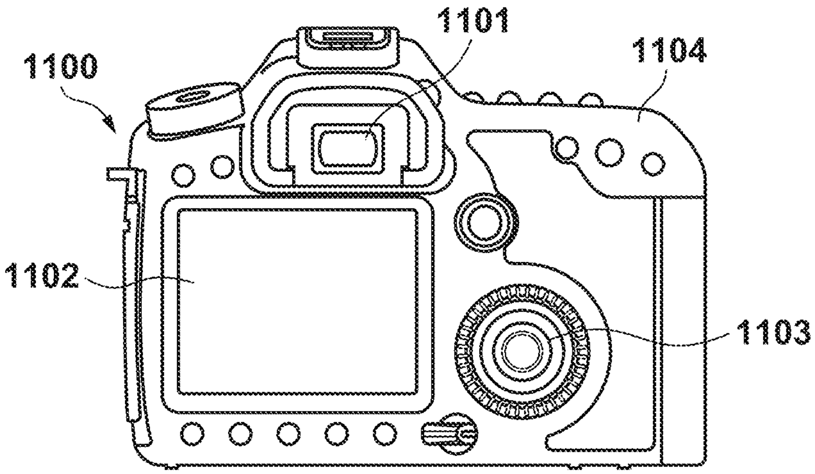
FIG. 18A is a schematic view showing an example of an image capturing device according to an embodiment of the present invention.

FIG. 18A is a schematic view showing an example of an image capturing device according to this embodiment. An image capturing device 1100 can include a viewfinder 1101, a rear display 1102, an operation unit 1103, and a housing 1104. The viewfinder 1101 may include the display device using the light emitting device according to each of the first to fifth embodiments. In this case, the display device can display not only an image to be captured but also environment information, image capturing instructions, and the like. Examples of the environment information are the intensity and direction of external light, the moving velocity of an object, and the possibility that an object is covered with an obstacle.

The timing suitable for image capturing is a very short time, so the information is preferably displayed as soon as possible. Therefore, an organic light emitting element is preferably used for the light emitting element. This is so because the organic light emitting element has a high response speed. The display device using the organic light emitting element can be used for the devices that require a high display speed more suitably than for the liquid crystal display device.

The image capturing device 1100 includes an optical unit (not shown). This optical unit has a plurality of lenses, and forms an image on an image capturing element that is accommodated in the housing 1104. The focal points of the plurality of lenses can be adjusted by adjusting the relative positions. This operation can also automatically be performed. The image capturing device may be called a photoelectric conversion device. Instead of sequentially capturing an image, the photoelectric conversion device can include, as an image capturing method, a method of detecting the difference from a previous image, a method of extracting an image from an always recorded image, or the like.

Figure 18B:
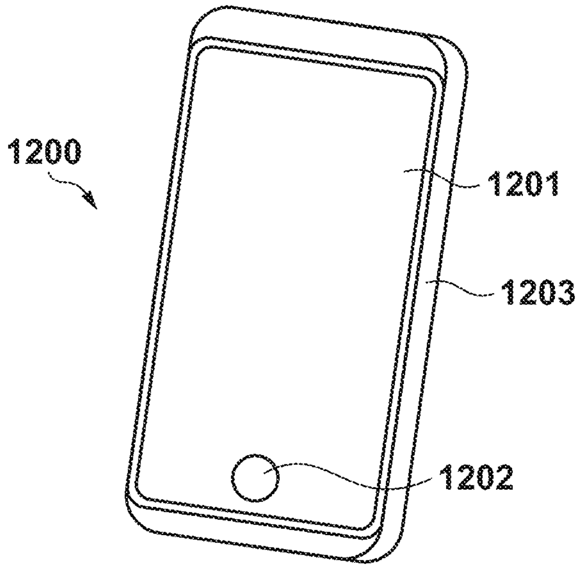
FIG. 18B is a schematic view showing an example of an electronic apparatus according to an embodiment of the present invention.

FIG. 18B is a schematic view showing an example of an electronic apparatus according to this embodiment. An electronic apparatus 1200 includes a display unit 1201, an operation unit 1202, and a housing 1203. The housing 1203 can accommodate a circuit, a printed board having this circuit, a battery, and a communication unit. The operation unit 1202 can be a button or a touch-panel-type reaction unit. The operation unit can also be a biometric authentication unit that performs unlocking or the like by authenticating the fingerprint. The electronic apparatus including the communication unit can also be regarded as a communication apparatus. The electronic apparatus can further have a camera function by including a lens and an image capturing element. An image captured by the camera function is displayed on the display unit. Examples of the electronic apparatus are a smartphone and a notebook computer.

Figure 19A:
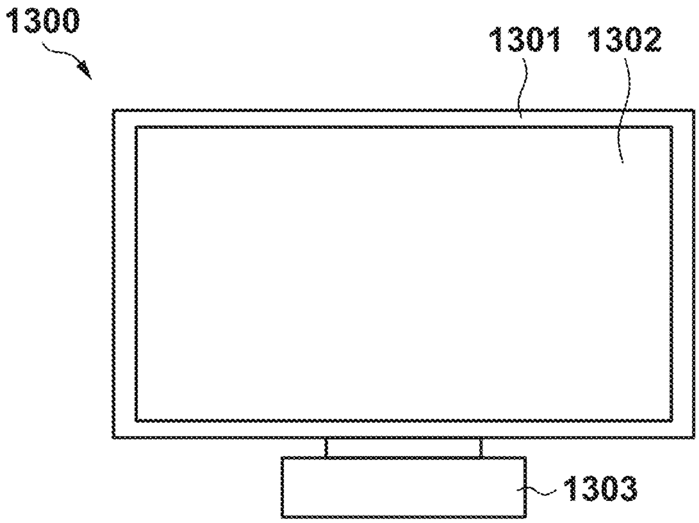
FIG. 19A is a schematic view showing an example of a display device according to an embodiment of the present invention.
Figure 19B:
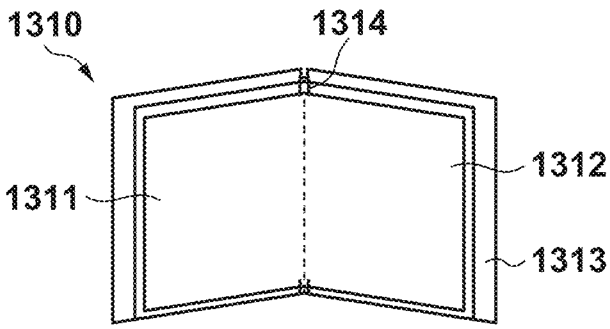
FIG. 19B is a schematic view showing an example of a foldable display device.

FIGS. 19A and 19B are schematic views showing examples of a display device using the light emitting device according to each of the first to fifth embodiments. FIG. 19A shows a display device such as a television monitor or a PC monitor. A display device 1300 includes a frame 1301 and a display unit 1302. When the light emitting device according to each of the above-described first to fifth embodiments is used for the display unit 1302, deterioration of a displayed image can be suppressed.

The display device 1300 includes a base 1303 that supports the frame 1301 and the display unit 1302. The base 1303 is not limited to the form shown in FIG. 19A. The lower side of the frame 1301 may also function as the base.

In addition, the frame 1301 and the display unit 1302 can be bent. The radius of curvature in this case can be 5,000 (inclusive) mm to 6,000 (inclusive) mm.

FIG. 19B is a schematic view showing another example of the display device. A display device 1310 shown in FIG. 19B can be folded, that is, the display device 1310 is a so-called foldable display device. The display device 1310 includes a first display unit 1311, a second display unit 1312, a housing 1313, and a bending point 1314. The first display unit 1311 and the second display unit 1312 may include the light emitting device according to each of the first to fifth embodiments. The first display unit 1311 and the second display unit 1312 can also be one seamless display device. The first display unit 1311 and the second display unit 1312 can be divided by the bending point. The first display unit 1311 and the second display unit 1312 can display different images, and can also display one image together.

Figure 20A:
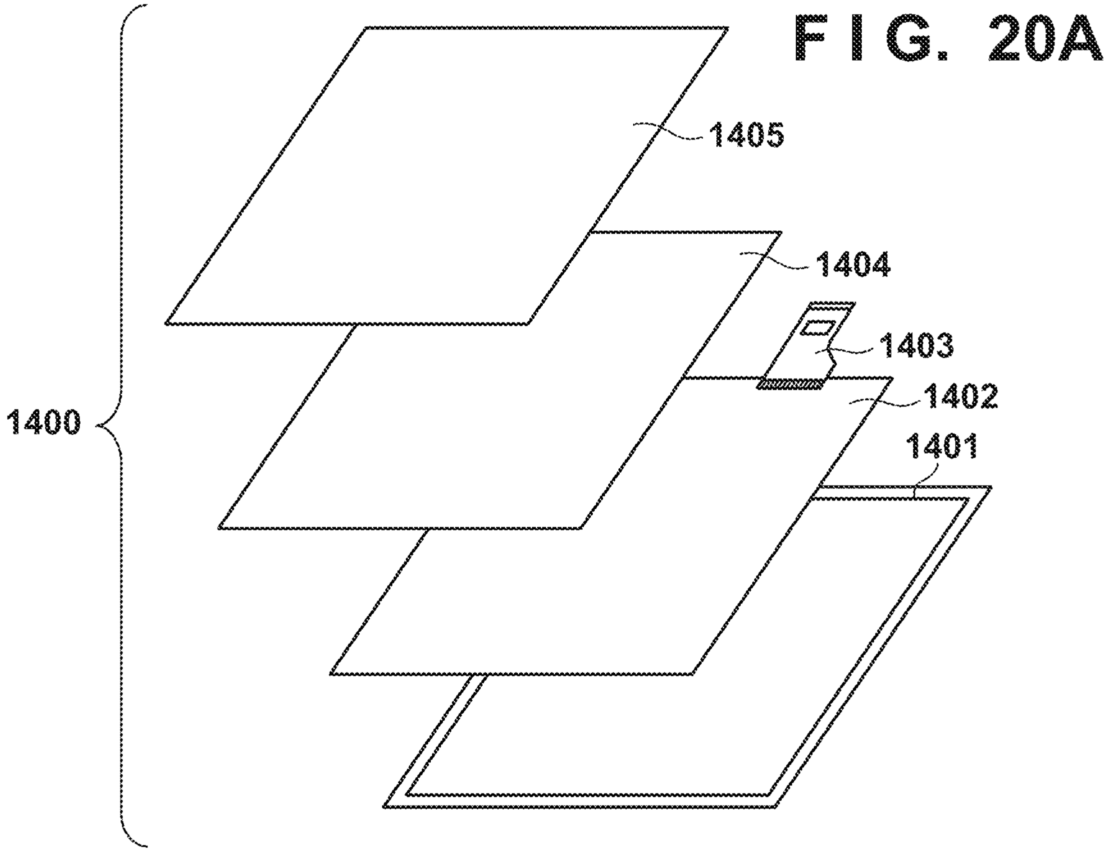
FIG. 20A is a schematic view showing an example of an illumination device according to an embodiment of the present invention.

FIG. 20A is a schematic view showing an example of an illumination device using the light emitting device according to each of the first to fifth embodiments. An illumination device 1400 may include a housing 1401, a light source 1402, a circuit board 1403, an optical film 1404, and a light diffusing unit 1405. The light source may include the light emitting device according to each of the first to fifth embodiments. An organic light emitting element is preferably used for the light emitting element. The optical film 1404 may be a filter that transmits light and improves the color rendering of the light source. When performing lighting-up or the like, the light diffusing unit can throw the light of the light source over a broad range by effectively diffusing the light. The optical film 1404 and the light diffusing unit 1405 may be provided on the illumination light emission side. The illumination device may also include a cover on the outermost portion, as needed.

The illumination device is, for example, a device for illuminating the interior of the room. The illumination device may emit white light, natural white light, or light of another color from blue to red. The illumination device may include a light control circuit for controlling these light components. The illumination device may include the light emitting device according to each of the first to fifth embodiments and a power supply circuit connected thereto. An organic light emitting element can be used as the light emitting element of the light emitting device. The power supply circuit is a circuit for converting an AC voltage into a DC voltage. White has a color temperature of 4,200 K, and natural white has a color temperature of 5,000 K. The illumination device may also include a color filter.

In addition, the illumination device according to this embodiment may include a heat radiation unit. The heat radiation unit radiates the internal heat of the device to the outside of the device, and examples are a metal having a high specific heat and liquid silicon.

Figure 20B:
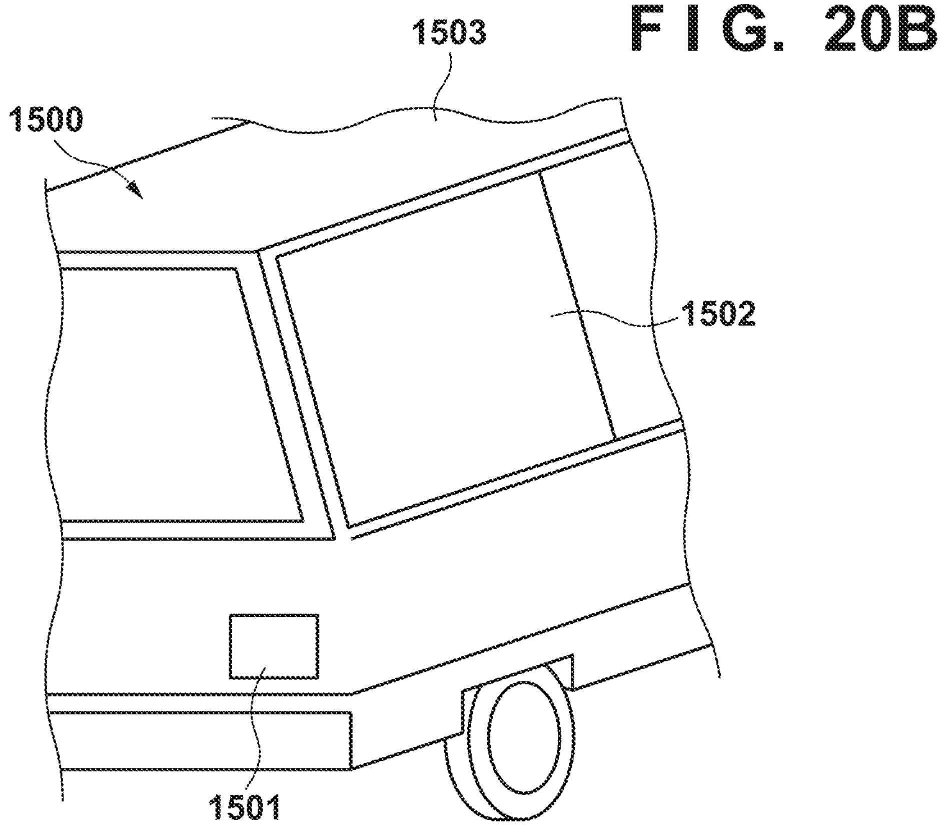
FIG. 20B is a schematic view showing an example of an automobile including a vehicle lighting appliance according an embodiment of the present invention.

FIG. 20B is a schematic view of an automobile as an example of a moving body according to this embodiment, that uses the light emitting device according to each of the first to fifth embodiments. The automobile has a taillight as an example of the lighting appliance. An automobile 1500 has a taillight 1501, and may have a form in which the taillight is turned on when performing a braking operation or the like.

The taillight 1501 may include the light emitting device according to each of the first to fifth embodiments. The taillight may include a protection member for protecting the light emitting device. The material of the protection member is not limited as long as the material is a transparent material with a strength that is high to some extent, and is preferably polycarbonate or the like. A furandicarboxylic acid derivative, an acrylonitrile derivative, or the like may be mixed in polycarbonate.

The automobile 1500 may include a vehicle body 1503, and a window 1502 attached to the vehicle body 1503. The window may be a transparent display as long as it is not a window for checking the front or rear of the automobile. This transparent display may include the light emitting device according to each of the first to fifth embodiments. In this case, the constituent materials of the electrodes and the like of the light emitting device are formed from transparent members.

The moving body according to this embodiment may be a ship, an airplane, a drone, or the like. The moving body may include a main body and a lighting appliance provided on the main body. The lighting appliance may emit light for making a notification of the position of the main body. The lighting appliance includes the light emitting device according to each of the first to fifth embodiments.

Figure 21A:
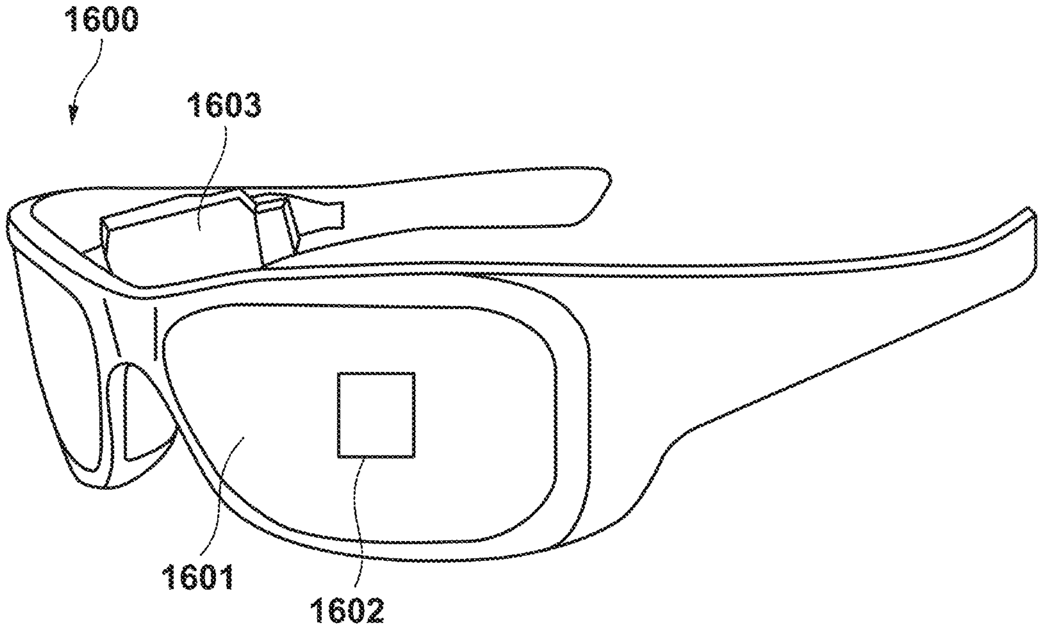
FIGS. 21A and 21B are schematic views each showing an example of a wearable device according to an embodiment of the present invention.
Figure 21B:
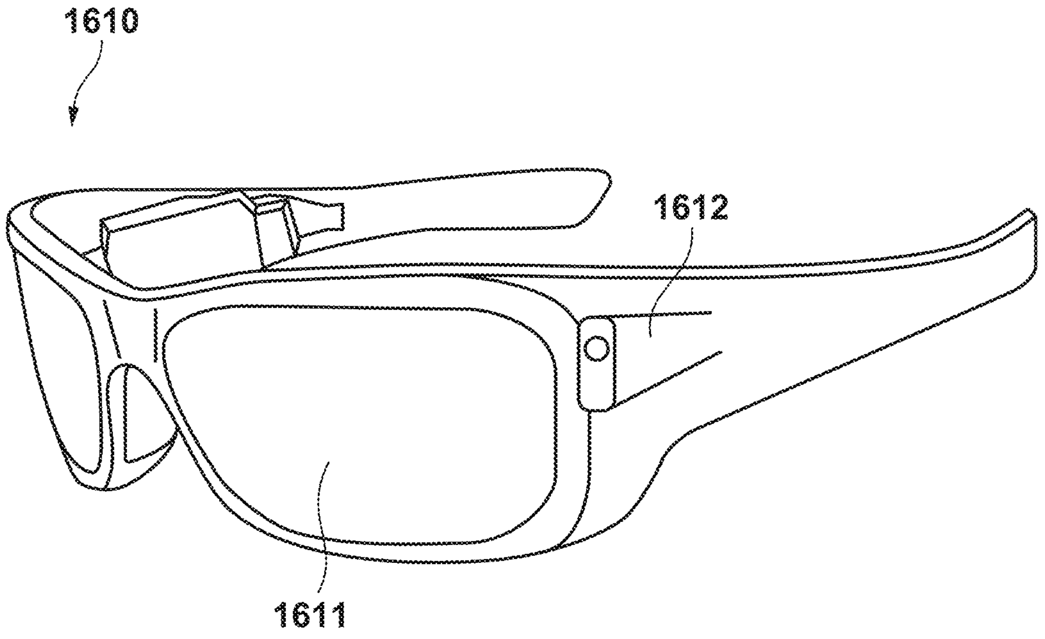

An application example of a display device using the light emitting device according to each of the first to fifth embodiments will be described with reference to FIGS. 21A and 21B. The display device can be applied to a system that can be worn as a wearable device such as smartglasses, an HMD, or a smart contact lens. The display device used for such applications can include an image capturing device capable of photoelectrically converting visible light and a display device capable of emitting visible light.

Glasses 1600 (smartglasses) according to one application example will be described with reference to FIG. 21A. An image capturing device 1602 such as a CMOS sensor or an SPAD is provided on the surface side of a lens 1601 of the glasses 1600. In addition, the display device of each of the above-described embodiments is provided on the back surface side of the lens 1601.

The glasses 1600 can further include a control device 1603. The control device 1603 functions as a power supply that supplies power to the image capturing device 1602 and the display device according to each embodiment. In addition, the control device 1603 controls the operations of the image capturing device 1602 and the display device. An optical system configured to condense light to the image capturing device 1602 is formed on the lens 1601.

Glasses 1610 (smartglasses) according to one application example will be described with reference to FIG. 21B. The glasses 1610 includes a control device 1612. An image capturing device corresponding to the image capturing device 1602 and a display device are mounted on the control device 1612. An optical system configured to project light emitted from the display device in the control device 1612 is formed in a lens 1611, and an image is projected to the lens 1611. The control device 1612 functions as a power supply that supplies power to the image capturing device and the display device, and controls the operations of the image capturing device and the display device.

The control device may include a line-of-sight detection unit that detects the line of sight of a wearer. The detection of a line of sight may be done using infrared rays. An infrared ray emitting unit emits infrared rays to an eyeball of the user who is gazing at a displayed image. An image capturing unit including a light receiving element detects reflected light of the emitted infrared rays from the eyeball, thereby obtaining a captured image of the eyeball. A reduction unit for reducing light from the infrared ray emitting unit to the display unit in a planar view is provided, thereby reducing deterioration of image quality.

The line of sight of the user to the displayed image is detected from the captured image of the eyeball obtained by capturing the infrared rays. An arbitrary known method can be applied to the line-of-sight detection using the captured image of the eyeball. As an example, a line-of-sight detection method based on a Purkinje image obtained by reflection of irradiation light by a cornea can be used.

More specifically, line-of-sight detection processing based on a pupil corneal reflection method is performed. Using the pupil corneal reflection method, a line-of-sight vector representing the direction (rotation angle) of the eyeball is calculated based on the image of the pupil and the Purkinje image included in the captured image of the eyeball, thereby detecting the line-of-sight of the user.

The display device according to this embodiment can include an image capturing device including a light receiving element, and a displayed image on the display device can be controlled based on the line-of-sight information of the user from the image capturing device.

More specifically, the display device can decide a first display region at which the user is gazing and a second display region other than the first display region based on the line-of-sight information. The first display region and the second display region may be decided by the control device of the display device, or those decided by an external control device may be received. In the display region of the display device, the display resolution of the first display region may be controlled to be higher than the display resolution of the second display region. That is, the resolution of the second display region may be lower than that of the first display region.

In addition, the display region includes a first display region and a second display region different from the first display region, and a region of higher priority is decided from the first display region and the second display region based on line-of-sight information. The first display region and the second display region may be decided by the control device of the display device, or those decided by an external control device may be received. The resolution of the region of higher priority may be controlled to be higher than the resolution of the region other than the region of higher priority. That is, the resolution of the region of relatively low priority may be low.

Note that AI may be used to decide the first display region or the region of higher priority. The AI may be a model configured to estimate the angle of the line of sight and the distance to a target ahead the line of sight from the image of the eyeball using the image of the eyeball and the direction of actual viewing of the eyeball in the image as supervised data. The AI program may be held by the display device, the image capturing device, or an external device. If the external device holds the AI program, it is transmitted to the display device via communication.

When performing display control based on line-of-sight detection, this can be applied to smartglasses further including an image capturing device configured to capture the outside. The smartglasses can display captured outside information in real time.

As has been described above, by using the light emitting device according to the embodiment in an apparatus, display with fine image quality and stable even for a long period of time is possible.

The present disclosure can provide a light emitting device having a configuration advantageous in suppressing deterioration of image quality caused by a conversion operation of a DA converter in the light emitting device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-023949, filed Feb. 20, 2024, which is hereby incorporated by reference herein in its entirety.

What is claimed is:

1. A light emitting device comprising:

a plurality of pixels arranged to form a plurality of rows and a plurality of columns;

a plurality of column circuits configured to drive the plurality of columns, respectively;

a voltage generation circuit configured to output a set of voltage signals; and a control circuit, wherein each of the plurality of pixels comprises (1) a first sub-pixel configured to emit light in a first color, (2) a second sub-pixel configured to emit light in a second color different from the first color, and (3) a third sub-pixel configured to emit light in a third color different from the first color and the second color, wherein each of the plurality of column circuits comprises (1) a first selection circuit configured to output one of first color data, second color data, and third color data which are input to the column circuit and which correspond to the first color, the second color, and the third color, respectively, (2) a digital-analog converter configured to convert, based on the set of voltage signals output by the voltage generation circuit, the output one of the first color data, the second color data, and the third color data into an analog signal, and (3) a second selection circuit configured to supply the analog signal output from the digital-analog converter to one of the first sub-pixel, the second sub-pixel, and the third sub-pixel that emits light in a corresponding color, wherein the plurality of column circuits comprises a first column circuit, a second column circuit, and a third column circuit, wherein the control circuit controls such that, in a first period, (1) in the first column circuit, the first selection circuit outputs the first color data to the digital-analog converter, (2) in the second column circuit, the first selection circuit outputs the second color data to the digital-analog converter, and (3) in the third column circuit, the first selection circuit outputs the third color data to the digital-analog converter, wherein the first column circuit comprises a first latch circuit and a second latch circuit each configured to hold one of the first color data and the second color data, wherein the second column circuit comprises a third latch circuit and a fourth latch circuit each configured to hold one of the first color data and the second color data, and wherein the control circuit controls input to each latch circuit such that (1) the first color data is input to the first latch circuit and the fourth latch circuit and (2) the second color data is input to the second latch circuit and the third latch circuit, and wherein the control circuit controls the first selection circuit of each of the first column circuit and the second column circuit such that the first selection circuit outputs, in the first period, one of the first color data and the second color data held by the first latch circuit and the third latch circuit, and outputs, in a second period following the first period, one of the first color data and the second color data held by the second latch circuit and the fourth latch circuit.

2. The device according to claim 1, wherein the control circuit controls such that, in the second period following the first period, the first selection circuit of each of the first column circuit and the second column circuit outputs, to the digital-analog converter, one of the first color data and the second color data which is different from one of the first color data and the second color data output by the first selection circuit in the first period.

3. The device according to claim 1, wherein the control circuit further controls to execute (1) a first mode for causing the first selection circuit of the first column circuit to output the first color data and causing the first selection circuit of the second column circuit to output the second color data, and (2) a second mode for causing the first selection circuit of each of the first column circuit and the second column circuit to output one of the first color data and the second color data.

4. The device according to claim 1, wherein the first selection circuits of the first column circuit and the second column circuit are controlled to operate synchronously.

5. The device according to claim 1, wherein the first selection circuit and the second selection circuit of each of the plurality of column circuits are controlled to operate synchronously.

6. The device according to claim 1, wherein the first column circuit and the second column circuit drive a first pixel and a second pixel arranged in a predetermined row of the plurality of rows based on the first color data and the second color data supplied to the respective digital-analog converters in the first period.

7. The device according to claim 1, wherein the first column circuit and the second column circuit are arranged alternately in a row direction.

8. The device according to claim 1, wherein the plurality of column circuits are divided into blocks each including a predetermined number of column circuits, and wherein the control circuit controls such that all of the first selection circuits of the column circuits included in the block do not output the same one of the first color data and the second color data in the first period.

9. The device according to claim 1, wherein each of the plurality of column circuits further includes a driving circuit, and wherein an output of the digital-analog converter is supplied to one of the first sub-pixel and the second sub-pixel via the driving circuit.

10. An image forming device comprising:

a photosensitive member;

an exposure light source configured to expose the photosensitive member;

a developing device configured to apply a developing agent to the exposed photosensitive member; and a transfer device configured to transfer an image developed by the developing device to a print medium, wherein the exposure light source includes the light emitting device according to claim 1.

11. An image capturing device comprising:

an optical unit including a plurality of lenses;

an image capturing element configured to receive light having passed through the optical unit; and a display unit configured to display an image captured by the image capturing element, wherein the display unit includes the light emitting device according to claim 1.

12. A display device comprising:

a display unit including the light emitting device according to claim 1; and a housing provided with the display unit.

13. An electronic apparatus comprising:

a display unit including the light emitting device according to claim 1;

a housing provided with the display unit; and a communication unit provided in the housing and configured to perform external communication.

14. An illumination device comprising:

a light source including the light emitting device according to claim 1; and one of a light diffusing unit and an optical film, the light diffusing film and the optical film being configured to transmit light emitted by the light source.

15. A mobile body comprising:

a lighting appliance including the light emitting device according to claim 1; and a body provided with the lighting appliance.

16. A wearable device comprising:

a display device configured to display an image, wherein the display device includes the light emitting device according to claim 1.

17. A light emitting device comprising:

a plurality of pixels arranged to form a plurality of rows and a plurality of columns;

a plurality of column circuits configured to drive the plurality of columns, respectively;

a voltage generation circuit configured to output a set of voltage signals; and a control circuit, wherein each of the plurality of pixels comprises (1) a first sub-pixel configured to emit light in a first color, (2) a second sub-pixel configured to emit light in a second color different from the first color, and (3) a third sub-pixel configured to emit light in a third color different from the first color and the second color, wherein each of the plurality of column circuits comprises (1) a first selection circuit configured to output one of first color data, second color data, and third color data which are input to the column circuit and which correspond to the first color, the second color, and the third color, respectively, (2) a digital-analog converter configured to convert, based on the set of voltage signals output by the voltage generation circuit, the output one of the first color data, the second color data, and the third color data into an analog signal, and (3) a second selection circuit configured to supply the analog signal output from the digital-analog converter to one of the first sub-pixel, the second sub-pixel, and the third sub-pixel that emits light in a corresponding color, wherein the plurality of column circuits comprises a first column circuit, a second column circuit, and a third column circuit, wherein the control circuit controls such that, in a first period, (1) the first selection circuit outputs the first color data to the digital-analog converter in the first column circuit, (2) the first selection circuit outputs the second color data to the digital-analog converter in the second column circuit, and (3) the first selection circuit outputs the third color data to the digital-analog converter in the third column circuit, and wherein the control circuit further controls to execute (1) a first mode for causing the first selection circuit of the first column circuit to output the first color data and for causing the first selection circuit of the second column circuit to output the second color data, and (2) a second mode for causing the first selection circuit of each of the first column circuit and the second column circuit to output one of the first color data and the second color data.

18. The device according to claim 17, wherein the control circuit controls such that, in a second period following the first period, the first selection circuit of each of the first column circuit and the second column circuit outputs, to the digital-analog converter, one of the first color data and the second color data which is different from one of the first color data and the second color data output by the first selection circuit in the first period.

19. A wearable device including:

a display device configured to display an image, wherein the display device includes the light emitting device according to claim 17.

* * * * *